US011384515B2

(12) United States Patent
Yoshinada et al.

(10) Patent No.: US 11,384,515 B2
(45) Date of Patent: Jul. 12, 2022

(54) IMAGE DISPLAY SYSTEM FOR WORK MACHINE, REMOTE OPERATION SYSTEM FOR WORK MACHINE, AND WORK MACHINE

(71) Applicants: Komatsu Ltd., Tokyo (JP); Osaka University, Suita (JP)

(72) Inventors: Hiroshi Yoshinada, Tokyo (JP); Takanobu Tanimoto, Toyonaka (JP)

(73) Assignees: Komatsu LTD., Tokyo (JP); Osaka University, Osaka (JP)

(*) Notice: Subject to any disclaimer, the term of this patent is extended or adjusted under 35 U.S.C. 154(b) by 0 days.

(21) Appl. No.: 17/012,362

(22) Filed: Sep. 4, 2020

(65) Prior Publication Data

US 2020/0399869 A1 Dec. 24, 2020

Related U.S. Application Data

(62) Division of application No. 15/553,663, filed as application No. PCT/JP2016/054437 on Feb. 16, 2016, now Pat. No. 10,829,910.

(30) Foreign Application Priority Data

Mar. 5, 2015 (JP) .............................. JP2015-044050

(51) Int. Cl.
*B60R 1/00* (2022.01)
*E02F 9/26* (2006.01)
(Continued)

(52) U.S. Cl.
CPC ................ *E02F 9/264* (2013.01); *B60R 1/00* (2013.01); *E02F 9/205* (2013.01); *E02F 9/261* (2013.01); *B60R 2300/302* (2013.01); *E02F 3/32* (2013.01)

(58) Field of Classification Search
None
See application file for complete search history.

(56) References Cited

U.S. PATENT DOCUMENTS 5,996,702 A * 12/1999 Hall .......................... E02F 9/26
172/4.5
6,047,227 A 4/2000 Henderson et al.
(Continued)

FOREIGN PATENT DOCUMENTS

CN 1651666 A 8/2005
CN 103328313 A 9/2013
(Continued)

OTHER PUBLICATIONS

International Search Report dated Apr. 5, 2016, issued for PCT/JP2016/054437.
(Continued)

*Primary Examiner* — James M McPherson
(74) *Attorney, Agent, or Firm* — Locke Lord LLP

(57) ABSTRACT

An image display system for a work machine includes an imaging device mounted to a work machine including a working unit having a working implement, an attitude detector detecting an attitude of the working unit, a distance detector determining information about distance to an object to be worked by the work machine, and a processor using information about position of the working implement obtained using an attitude of the working unit, and information about position of the object to be worked obtained from the information about distance from the work machine to an object to be worked, determined by the distance detector, generating an image of a portion corresponding to the working implement, on the object to be worked opposing the working implement, combining the generated image with an image of the object to be worked imaged by the
(Continued)

imaging device, and displaying the combined image on a display device.

12 Claims, 15 Drawing Sheets

(51) Int. Cl.
*E02F 9/20* (2006.01)
*E02F 3/32* (2006.01)

(56) References Cited

U.S. PATENT DOCUMENTS

| | | | |
|---|---|---|---|
| 8,914,199 B2 | 12/2014 | Nomura et al. | |
| 8,965,642 B2 | 2/2015 | Johnson et al. | |
| 2003/0226290 A1 | 12/2003 | Savard et al. | |
| 2005/0256607 A1 | 11/2005 | Shepherd et al. | |
| 2006/0034535 A1* | 2/2006 | Koch | H04N 5/272 |
| | | | 382/254 |
| 2013/0222573 A1 | 8/2013 | Onuma et al. | |
| 2013/0278772 A1 | 10/2013 | Yun | |
| 2014/0099178 A1* | 4/2014 | Nomura | E02F 9/26 |
| | | | 414/685 |
| 2014/0100744 A1* | 4/2014 | Johnson | E02F 3/3677 |
| | | | 701/50 |
| 2014/0271074 A1 | 9/2014 | Ogawa | |
| 2014/0297040 A1 | 10/2014 | Baba et al. | |
| 2016/0054114 A1* | 2/2016 | Crozier | G01S 19/14 |
| | | | 702/151 |
| 2016/0076228 A1* | 3/2016 | Nau | E02F 9/26 |
| | | | 701/50 |
| 2016/0138249 A1 | 5/2016 | Conway et al. | |

FOREIGN PATENT DOCUMENTS

| | | |
|---|---|---|
| CN | 103857853 A | 6/2014 |
| JP | 01-165827 A | 6/1989 |
| JP | 06-317090 A | 11/1994 |
| JP | H11-36373 A | 2/1999 |
| JP | H11-213154 A | 8/1999 |
| JP | 2001-98585 A | 4/2001 |
| JP | 2001-220766 A | 8/2001 |
| JP | 2006-053922 A | 2/2006 |
| JP | 2006-107959 A | 4/2006 |
| JP | 2008-121280 A | 5/2008 |
| JP | 2013-113044 A | 6/2013 |
| JP | 2014-074318 A | 4/2014 |
| WO | 2014/054354 A1 | 4/2014 |
| WO | 2014/061790 A1 | 4/2014 |

OTHER PUBLICATIONS

Soichiro Iwataki et al. "Presentation of Surrounding Environment and Operation Part by Texture Mapping to 3DCG Model for Teleoperation of Construction Machines" 15th Society of Instrument and Control Engineers systems integration division lecture meeting Lecture collected-papers, Dec. 2014, pp. 2106-2109.

\* cited by examiner

IMAGE DISPLAY SYSTEM FOR WORK MACHINE, REMOTE OPERATION SYSTEM FOR WORK MACHINE, AND WORK MACHINE

This Application is a Division of U.S. application Ser. No. 15/553,663 filed on Aug. 25, 2017, which is a National Stage Entry of PCT/JP2016/054437, which claims priority from Application 2015-044050 filed on Mar. 5, 2015 in Japan. The entire contents of these applications are incorporated herein by reference in their entirety.

FIELD

The present invention relates to an image display system for a work machine, a remote operation system for a work machine, and a work machine.

BACKGROUND

As described in Patent Literature 1, techniques are known for remotely operating a work machine such as an excavator.

CITATION LIST

Patent Literature

Patent Literature 1: Japanese Patent Application No. 2004-294067

SUMMARY

Technical Problem

In remote operation of a work machine, an image of a work machine, which is displayed as seen from an operator, is used for operation, but the image is two-dimensionally displayed and there is almost no sense of perspective. Therefore, it is difficult to grasp the distance between an object to be worked and the work machine, and the working efficiency of the work machine may decrease. In addition, when an operator boarded on the work machine operates a working unit, it is difficult to grasp the distance between the working unit and the object to be worked, depending on the skill of the operator, and working efficiency may be reduced.

It is an object of the present invention to provide a work machine including a working unit having a working implement which prevents reduction in working efficiency.

Solution to Problem

According to the present invention, an image display system for a work machine comprises: an imaging device mounted to a work machine including a working unit having a working implement; an attitude detection device configured to detect an attitude of the working unit; a distance detection device configured to determine information about a distance to an object to be worked by the work machine; and a processing device configured, by using information about a position of the working implement obtained using the attitude of the working unit, and information about a position of the object to be worked obtained from the information about the distance determined by the distance detection device, to generate an image of a portion corresponding to the working implement, on the object to be worked opposing the working implement, and configured to combine the generated image with an image of the object to be worked imaged by the imaging device, and configured to display the combined image on a display device. It is preferable that the processing device generates an image of a portion corresponding to the working implement, with the imaging device as a reference.

It is preferable that the line image includes grids having a plurality of first line images, and a plurality of second line images crossing the plurality of first line images.

It is preferable that the processing device is configured, by using the attitude of the working unit, to determine an area occupied by the working implement in the image of the object to be worked, and is configured to remove the determined area from information about a terrain of the object to be worked.

It is preferable that the working implement has a bucket, and the processing device is configured to generate a line image of a portion corresponding to tooth points of the bucket, on the object to be worked, as the image of the portion corresponding to the working implement, on the object to be worked opposing the working implement.

It is preferable that the processing device is configured to generate an image of a straight line connecting the object to be worked and a side of one end in a width direction of the tooth points of the bucket, and an image of a straight line connecting the object to be worked and a side of the other end in the width direction of the tooth points of the bucket, and is configured to combine the generated images with the image of the object to be worked imaged by the imaging device, and is configured to display the combined image on a display device.

It is preferable that the processing device is configured to determine spatial position information about the working implement or the object to be worked, and display the spatial position information on the display device.

It is preferable that the processing device is configured to determine at least one of the position of the working implement, the attitude of the working implement, a position of the object to be worked, a relative attitude of the object to be worked, a relative distance between the working implement and the object to be worked, and a relative attitude of the working implement and the object to be worked, and is configured to display the determined at least one on the display device.

It is preferable that the processing device is configured, by using the information about the position of the object to be worked, to generate a line image along a surface of the object to be worked, and is configured to combine the line image with the image of the object to be worked, and is configured to display the combined image on the display device.

It is preferable that the imaging device, the attitude detection device, and the distance detection device are provided in the work machine, and the processing device and the display device are provided in a facility including an operation device configured to remotely control the work machine.

According to the present invention, an image display system for a work machine comprises: a display device; and a processing device configured, by using information about a position of the working implement obtained using an attitude of a working unit having the working implement, and information about a position of an object to be worked of the working unit obtained from information about a distance from the working unit to the object to be worked, determined by a distance detection device included in a work machine including the working unit, to generate an image of a portion corresponding to the working implement, on the object to be worked opposing the working implement, with the imaging device as a reference, and configured to combine the generated image with an image of the object to be worked imaged by the imaging device, and configured to display the combined image on the display device, wherein the display device and the processing device are provided to remotely operate the work machine.

According to the present invention, a remote operation system for a work machine comprises: the image display system for a work machine; and an operation device configured to operate the working unit included in the work machine.

According to the present invention, a work machine comprises the image display system for a work machine.

Advantageous Effects of Invention

The present invention can suppress reduction in working efficiency, when working is performed using a work machine including a working unit having a working implement.

DESCRIPTION OF EMBODIMENTS

Modes for carrying out the present invention (embodiments) will be described below in detail with reference to the drawings.

<Outline of Image Display System For Work Machine and Remote Operation System For Work Machine>

Figure 1:
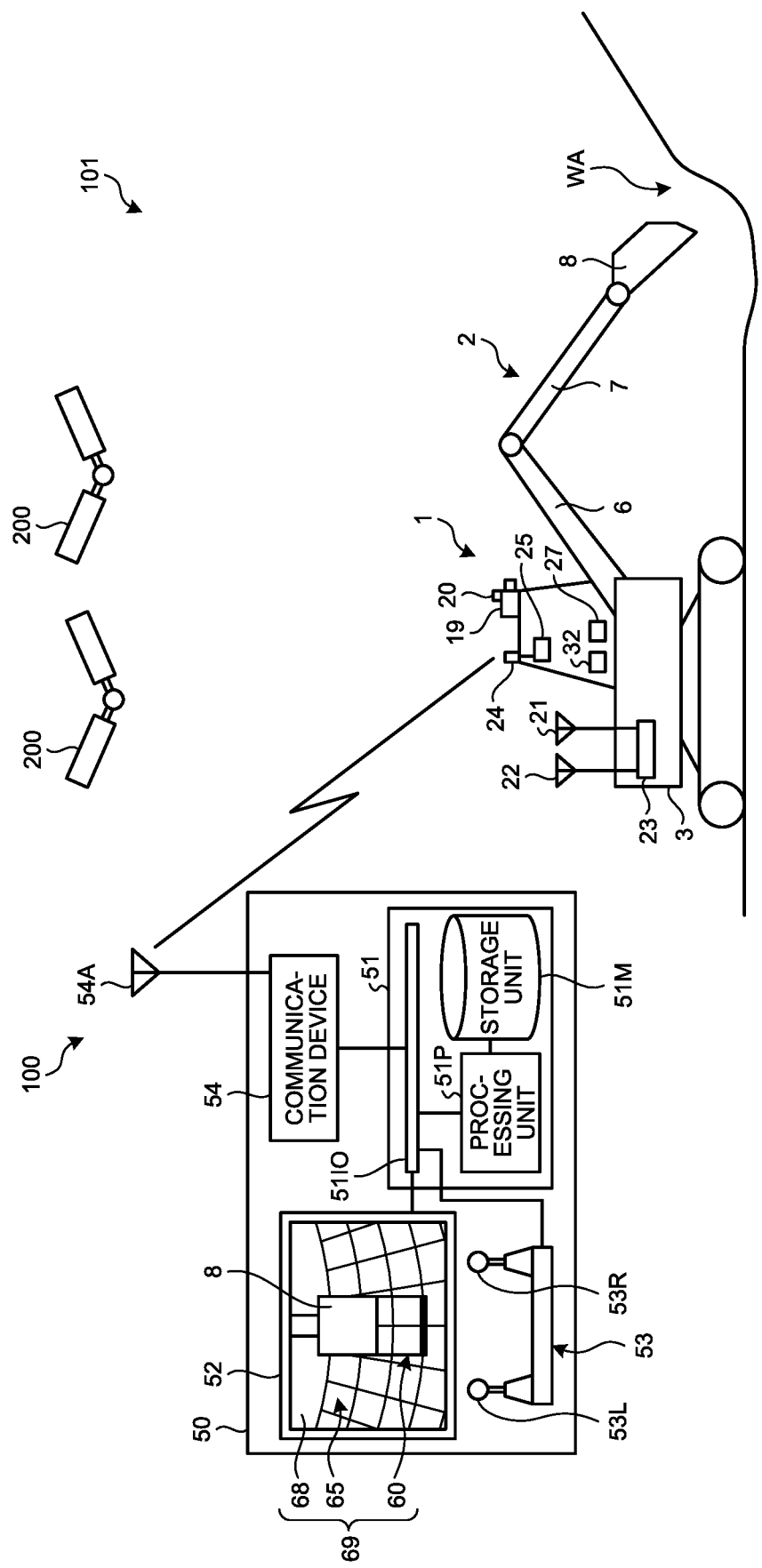
FIG. 1 is a diagram illustrating an image display system for a work machine and a remote operation system for a work machine, according to an embodiment.

FIG. 1 is a diagram illustrating an image display system 100 for a work machine and a remote operation system 101 for a work machine, according to an embodiment. In the image display system 100 for a work machine (hereinafter appropriately referred to as image display system 100), when an operator remotely operates an excavator 1 as a work machine, an object to be worked for an excavator 1, more specifically, a terrain surface to be worked by a working unit 2 of the excavator 1, that is, an object WA to be worked, and a bucket 8 as a working implement are imaged by an imaging device 19, and the obtained image is displayed on a display device 52. At this time, the image display system 100 displays, on the display device 52, a work image 69 including an image 68 of the object WA to be worked, captured by the imaging device 19, a grid image 65, and an image 60 for indicating a position of the bucket 8 on the object WA to be worked.

The image display system 100 includes the imaging device 19, an attitude detection device 32, a distance detection device 20, and a processing device 51. The remote operation system 101 for a work machine (hereinafter appropriately referred to as remote operation system 101) includes the imaging device 19, the attitude detection device 32, the distance detection device 20, a working unit control device 27, the display device 52, the processing device 51, and an operation device 53. According to an embodiment, the imaging device 19, the attitude detection device 32, and the distance detection device 20 of the image display system 100 are provided at the excavator 1, and the processing device 51 is provided in a facility 50. The facility 50 is a facility for remotely controlling the excavator 1, or managing the excavator 1. According to an embodiment, the imaging device 19, the attitude detection device 32, the distance detection device 20, and the working unit control device 27 of the remote operation system 101 are provided at the excavator 1, and the display device 52, the processing device 51, and the operation device 53 are provided in the facility 50.

The processing device 51 of the image display system 100 includes a processing unit 51P, a storage unit 51M, and an input/output unit 51IO. The processing unit 51P is, for example, a processor such as a central processing unit (CPU). The storage unit 51M is, for example, a random access memory (RAM), a read only memory (ROM), a hard disk drive, a storage device, or a combination thereof. The input/output unit 51IO is an interface circuit for connecting the processing device 51 and external devices. According to an embodiment, the display device 52, the operation device 53, and a communication device 54 are connected, as the external devices, to the input/output unit 51IO. The external devices connected to the input/output unit 51IO are not limited thereto.

The processing device 51 uses information about position of the bucket 8 as a working implement, which is obtained using an attitude of the working unit 2, and information about position of the object WA to be worked, which is obtained from the information about distance determined by the distance detection device 20, to generate an image of a portion corresponding to the bucket 8, on the object WA to be worked opposing the bucket 8. The image is viewed from the imaging device 19. Then, the processing device 51 combines an image of a portion corresponding to the bucket 8 with an image of the object WA to be worked imaged by the imaging device 19, and causes the display device 52 to display the combined image. The object WA to be worked is a surface on which the working unit 2 of the excavator 1 performs work, such as excavation or land leveling.

The display device 52 exemplifies a liquid crystal display or a projector, but the present invention is not limited thereto. The communication device 54 includes an antenna 54A. The communication device 54 communicates with a communication device 25 provided at the excavator 1 to acquire information of the excavator 1 or transmit information to the excavator 1.

The operation device 53 has a left operation lever 53L mounted on the left side of the operator and a right operation lever 53R mounted on the right side of the operator. Back and forth and right and left movements of each of the left operation lever 53L and the right operation lever 53R correspond to two-axis movement. For example, back and forth operation of the right operation lever 53R corresponds to operation of a boom 6 of the working unit 2 provided at the excavator 1. Right and left operation of the right operation lever 53R corresponds to the operation of the bucket 8 of the working unit 2. Back and forth operation of the left operation lever 53L corresponds to the operation of an arm 7 of the working unit 2. Right and left operation of the left operation lever 53L corresponds to the swing of a upper swing body 3 of the excavator 1.

The operation amounts of the left operation lever 53L and the right operation lever 53R are detected by, for example, a potentiometer and a Hall IC, and the processing device 51 generates a control signal for controlling an electromagnetic control valve, on the basis of these detected values. This signal is transmitted to the working unit control device 27 through the communication device 54 of the facility 50 and the communication device 25 of the excavator 1. The working unit control device 27 controls the electromagnetic control valve on the basis of the control signal to control the working unit 2. The electromagnetic control valve will be described later.

The processing device 51 acquires an input to at least one of the left operation lever 53L and the right operation lever 53R, and generates a command for moving at least one of the working unit 2 and the upper swing body 3. The processing device 51 transmits the generated command to the communication device 25 of the excavator 1 through the communication device 54. The working unit control device 27 included in the excavator 1 acquires the command from the processing device 51 through the communication device 25, and moves at least one of the working unit 2 and the upper swing body 3 according to the command.

The excavator 1 includes the communication device 25, the working unit control device 27, the attitude detection device 32, the imaging device 19, the distance detection device 20, antennas 21 and 22, and a global position calculation device 23. The working unit control device 27 controls the working unit 2. The communication device 25 is connected to an antenna 24, and communicates with the communication device 54 included in the facility 50. The working unit control device 27 controls the working unit 2 and the upper swing body 3. The attitude detection device 32 detects an attitude of at least one of the working unit 2 and the excavator 1. The imaging device 19 is attached to the excavator 1, and images the object WA to be worked. The distance detection device 20 obtains information about distance from a predetermined position of the excavator 1 to the object WA to be worked. The antennas 21 and 22 receive radio waves from a positioning satellite 200. The global position calculation device 23 uses the radio waves received by the antennas 21 and 22 to determine a global position of the antennas 21 and 22, that is, the position thereof in the global coordinate.

<Overall Configuration of Excavator 1>

Figure 2:
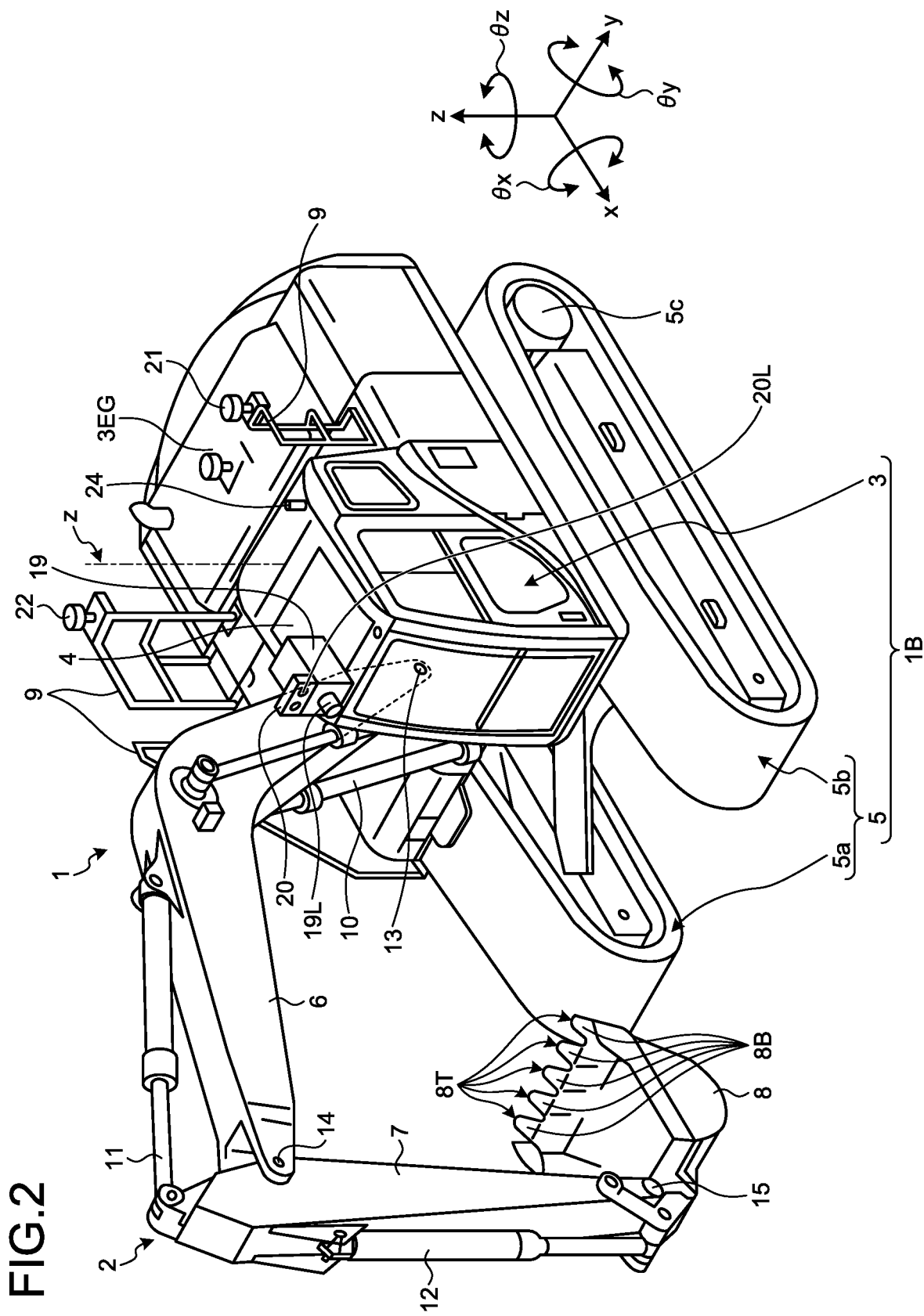
FIG. 2 is a perspective view illustrating an excavator as a work machine according to an embodiment.

FIG. 2 is a perspective view illustrating an excavator 1 as a work machine according to an embodiment. The excavator 1 includes a vehicle body 1B as a main body portion, and the working unit 2. The vehicle body 1B includes the upper swing body 3 as a swing body, and a travel unit 5 as a traveling body. The upper swing body 3 includes devices such as an engine as a power generation device and a hydraulic pump, in an engine room 3EG. According to an embodiment, the excavator 1 uses an internal combustion engine, such as a diesel engine, for an engine as the power generation device, but the power generation device is not limited to the internal combustion engine. The power generation device of the excavator 1 may have, for example, a so-called hybrid device having a combination of an internal combustion engine, a generator motor, and a power storage device. Further, the power generation device of the excavator 1 may have a device having a combination of a power storage device and a generator motor, without a combustion engine.

The upper swing body 3 includes a cab 4. The cab 4 is mounted on the other end side of the upper swing body 3. That is, the cab 4 is mounted on a side opposite to a side on which the engine room 3EG is disposed. A Handrail 9 is mounted on top of the upper swing body 3.

The upper swing body 3 is mounted on the travel unit 5. The travel unit 5 includes track belts 5a and 5b. The travel unit 5 is driven by one or both of hydraulic motors 5c provided on the right and left sides. The track belts 5a and 5b of the travel unit 5 are rotated to cause the excavator 1 to travel. The working unit 2 is mounted to a side of the cab 4 of the upper swing body 3.

The excavator 1 may include a travel unit including tires instead of the track belts 5a and 5b to transmit a driving force of the engine to the tires through a transmission for traveling. The excavator 1 having such a form includes, for example, a wheel excavator. In addition, the excavator 1 may be, for example, a backhoe loader configured to include a travel unit having such tires, have a working unit mounted to a vehicle body (main body portion), and have no upper swing body 3 or swing mechanism thereof as illustrated in FIG. 1. That is, the backhoe loader includes a vehicle body to which a working unit is mounted, and a travel unit constituting part of the vehicle body.

The upper swing body 3 has a front side on which the working unit 2 and the cab 4 are disposed, and a rear side on which the engine room 3EG is disposed. A front-back direction of the upper swing body 3 is an x direction. The front left side is the left side of the upper swing body 3, and the front right side is the right side of the upper swing body 3. A right-and-left direction of the upper swing body 3 is also referred to as a width direction or a y direction. The excavator 1 or the vehicle body 1B has a lower side located near the travel unit 5 from the upper swing body 3, and an upper side located near the upper swing body 3 from the travel unit 5. An up-and-down direction of the upper swing body 3 is the z direction. When the excavator 1 is placed on a horizontal surface, the lower side is positioned in the vertical direction, that is, in a direction in which gravity acts, and the upper side is positioned opposite to the vertical direction.

The working unit 2 includes a boom 6, an arm 7, a bucket 8 as a working implement, a boom cylinder 10, an arm cylinder 11, and a bucket cylinder 12. The boom 6 has a base end portion turnably mounted to a front portion of the vehicle body 1B through a boom pin 13. The arm 7 has a base end portion turnably mounted to an end portion of the boom 6 through an arm pin 14. The arm 7 has an end portion to which the bucket 8 is mounted through a bucket pin 15. The bucket 8 turns about the bucket pin 15. To the bucket 8, a plurality of teeth 8B is mounted on a side opposite from the bucket pin 15. A tooth point 8T represents a tip of a tooth 8B.

The bucket 8 may not have the plurality of teeth 8B. That is, the bucket 8 may be a bucket having no tooth 8B as illustrated in FIG. 2, and having a tooth point formed of a steel plate into a straight shape. The working unit 2 may include, for example, a tilt bucket having a single tooth. A tilt bucket is a bucket including a bucket tilt cylinder. The bucket tilts right and left to perform shaping or leveling of a slope or a flat ground into a desired shape, even when an excavator is on a sloping surface, and the bucket can perform compaction using a bottom plate. In addition, instead of the bucket 8, the working unit 2 may include, as a working implement, a slope finishing bucket, a rock breaking attachment including a rock breaking tip, or the like.

Each of the boom cylinder 10, the arm cylinder 11, and the bucket cylinder 12 illustrated in FIG. 2 is a hydraulic cylinder driven by the pressure of hydraulic fluid delivered from a hydraulic pump. The boom cylinder 10 drives the boom 6 to be raised and lowered. The arm cylinder 11 drives the arm 7 to be turned around the arm pin 14. The bucket cylinder 12 drives the bucket 8 to be turned around the bucket pin 15

The upper swing body 3 has an upper portion to which the antennas 21 and 22 and the antenna 24 are mounted. The antennas 21 and 22 are used for detecting a current position of the excavator 1. The antennas 21 and 22 are electrically connected to the global position calculation device 23 illustrated in FIG. 3. The global position calculation device 23 is a position detection device detecting the position of the excavator 1. The global position calculation device 23 uses real time kinematic-global navigation satellite systems (RTK-GNSS, GNSS represents global navigation satellite system) to detect a current position of the excavator 1. In the following description, the antennas 21 and 22 will be appropriately referred to as GNSS antennas 21 and 22. Signals according to GNSS radio waves received by the GNSS antennas 21 and 22 are input to the global position calculation device 23. The global position calculation device 23 determines installation positions of the GNSS antennas 21 and 22 in the global coordinate system. An example of the global navigation satellite system includes a global positioning system (GPS), but the global navigation satellite system is not limited thereto.

As illustrated in FIG. 2, the GNSS antennas 21 and 22 are preferably installed on top of the upper swing body 3, at positions at both ends of the excavator 1, spaced apart in a right-and-left direction, that is, a width direction. According to an embodiment, the GNSS antennas 21 and 22 are respectively mounted to the handrails 9 mounted on both sides of the upper swing body 3 in a width direction. Although the positions at which the GNSS antennas 21 and 22 are mounted to the upper swing body 3 are not limited to the handrails 9, the GNSS antennas 21 and 22 are preferably installed at positions spaced apart as far away as practicable for increased accuracy in detection of the current position of the excavator 1. In addition, the GNSS antennas 21 and 22 are preferably installed at positions where the operator's field of view is not obstructed.

The imaging device 19 images the object WA to be worked illustrated in FIG. 1, and the distance detection device 20 determines a distance from the distance detection device 20 (predetermined position of the excavator 1) to the object WA to be worked, so that information is preferably acquired from the object WA to be worked having an area as large as practicable. Therefore, according to an embodiment, the antenna 24, the imaging device 19, and the distance detection device 20 are disposed on top of the cab 4 of the upper swing body 3. Positions where the imaging device 19 and the distance detection device 20 are disposed are not limited to the top of the driver's seat 4. For example, the imaging device 19 and the distance detection device 20 may be disposed on the upper side in the cab 4.

The imaging device 19 has an imaging surface 19L facing forward of the upper swing body 3. The distance detection device 20 has a detection surface 20L facing forward of the upper swing body 3. According to an embodiment, the imaging device 19 is a monocular camera including a charge coupled device (CCD) image sensor or a complementary metal oxide semiconductor (CMOS) image sensor. According to an embodiment, the distance detection device 20 is a three-dimensional laser range finder or a distance sensor. The imaging device 19 and the distance detection device 20 are not limited thereto. For example, instead of the imaging device 19 and the distance detection device 20, a device may be used which has both of a function of acquiring an image of the object WA to be worked, and a function of determining a distance to the object WA to be worked. An example of such a device includes, for example, a stereo camera.

<Control System of Excavator 1>

Figure 3:
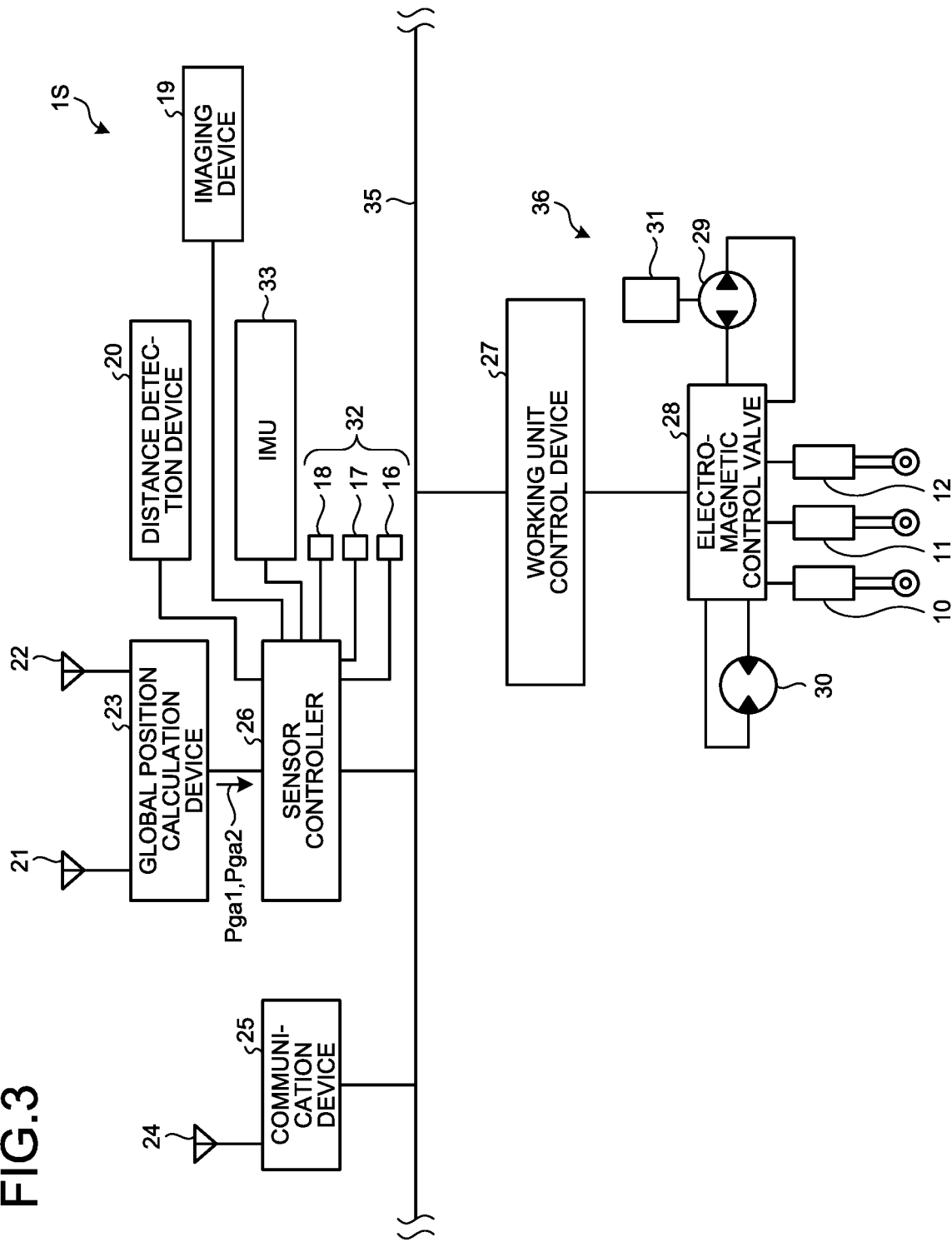
FIG. 3 is a diagram illustrating a control system of an excavator as a work machine according to an embodiment.

FIG. 3 is a diagram illustrating a control system 1S of an excavator 1 as a work machine according to an embodiment. The control system 1S includes the communication device 25, a sensor controller 26, the working unit control device 27, the imaging device 19, the distance detection device 20, the global position calculation device 23, the attitude detection device 32, an inertial measurement unit (IMU) 33, and a hydraulic system 36. The communication device 25, the sensor controller 26, and the working unit control device 27 are connected by a signal line 35. Such a structure enables the communication device 25, the sensor controller 26, and the working unit control device 27 to communicate information with each other thorough the signal line 35. An in-vehicle signal line, such as a controller area network (CAN), is exemplified as a signal line for transmitting information in the control system 1S.

The sensor controller 26 includes a processor such as a central processing unit (CPU), and storage devices such as a RAM and a ROM. A detection value from the global position calculation device 23, image information captured by the imaging device 19, a detection value from the distance detection device 20, a detection value from the attitude detection device 32, and a detection value from the IMU 33 are input to the sensor controller 26. The sensor controller 26 transmits the input detected values and image information to the processing device 51 in the facility 50 illustrated in FIG. 1, through the signal line 35 and the communication device 25.

The working unit control device 27 includes a processor such as a central processing unit (CPU), and storage devices such as a random access memory (RAM) and a read only memory (ROM). The working unit control device 27 acquires a command generated by the processing device 51 in the facility 50 to move at least one of the working unit 2 and the upper swing body 3, through the communication device 25. The working unit control device 27 controls a electromagnetic control valve 28 of the hydraulic system 36, on the basis of the acquired command.

The hydraulic system 36 includes the electromagnetic control valve 28, and hydraulic actuators, such as a hydraulic pump 29, the boom cylinder 10, the arm cylinder 11, the bucket cylinder 12, and a swing motor 30. The hydraulic pump 29 is driven by an engine 31, and delivers hydraulic fluid for moving the hydraulic actuators. The working unit control device 27 controls the electromagnetic control valve 28 to control the flow rate of the hydraulic fluid supplied to the boom cylinder 10, the arm cylinder 11, the bucket cylinder 12, and the swing motor 30. In this way, the working unit control device 27 controls the movement of the boom cylinder 10, the arm cylinder 11, the bucket cylinder 12, and the swing motor 30.

The sensor controller 26 acquires the detection values from a first stroke sensor 16, a second stroke sensor 17, and a third stroke sensor 18. The first stroke sensor 16 is provided at the boom cylinder 10, the second stroke sensor 17 is provided at the arm cylinder 11, and the third stroke sensor 18 is provided at the bucket cylinder 12.

The first stroke sensor 16 detects a boom cylinder length, which is a length of the boom cylinder 10, and outputs the boom cylinder length to the sensor controller 26. The second stroke sensor 17 detects an arm cylinder length, which is a length of the arm cylinder 11, and outputs the arm cylinder length to the sensor controller 26. The third stroke sensor 18 detects a bucket cylinder length, which is a length of the bucket cylinder 12, and outputs the bucket cylinder length to the sensor controller 26.

When the boom cylinder length, the arm cylinder length, and the bucket cylinder length are determined, an attitude of the working unit 2 is determined. Therefore, the first stroke sensor 16, the second stroke sensor 17, and the third stroke sensor 18, which detect these lengths, correspond to the attitude detection device 32 for detecting the attitude of the working unit 2. The attitude detection device 32 is not limited to the first stroke sensor 16, the second stroke sensor 17, and the third stroke sensor 18, and may be an angle detector.

On the basis of the boom cylinder length detected by the first stroke sensor 16, the sensor controller 26 calculates an inclination angle of the boom 6 relative to a direction (z-axis direction) orthogonal to a horizontal plane in a local coordinate system as a coordinate system of the excavator 1. The working unit control device 27 calculates an inclination angle of the arm 7 relative to the boom 6, on the basis of the arm cylinder length detected by the second stroke sensor 17. The working unit control device 27 calculates an inclination angle of the bucket 8 relative to the arm 7, on the basis of the bucket cylinder length detected by the third stroke sensor 18. The inclination angles of the boom 6, the arm 7, and the bucket 8 are information representing an attitude of the working unit 2. That is, the sensor controller 26 determines information representing an attitude of the working unit 2. The sensor controller 26 transmits the calculated inclination angles to the processing device 51 in the facility 50 illustrated in FIG. 1, through the signal line 35 and the communication device 25.

The GNSS antenna 21 receives a position P1 indicating a position of the GNSS antenna 21, from a positioning satellite. The GNSS antenna 22 receives a position 22 indicating a position of the GNSS antenna 22, from the positioning satellite. The GNSS antennas 21 and 22 receive the positions P1 and P2, for example, at 10 Hz intervals. The positions P1 and P2 are information about positions where the GNSS antennas are installed, in the global coordinate system. Signals according to the GNSS radio waves received by the GNSS antennas 21 and 22, that is, the positions P1 and P2 are input to the global position calculation device 23. Every time receiving the positions P1 and P2, the GNSS antennas 21 and 22 output the signals to the global position calculation device 23.

The global position calculation device 23 includes a processor such as a CPU, and storage devices such as a RAM and a ROM. The global position calculation device 23 detects the positions P1 and P2 of the GNSS antennas 21 and 22 in the global coordinate system, for example, at 10 Hz intervals, and outputs the positions P1 and P2 as reference position information Pga1 and Pga2 to the sensor controller 26. According to an embodiment, the global position calculation device 23 determines an azimuth angle of the excavator 1, more specifically, a yaw angle as the azimuth angle of the upper swing body 3, using the acquired two positions P1 and P2, and outputs the angle to the sensor controller 26. The sensor controller 26 transmits the acquired reference position information Pga1 and Pga2 and yaw angle to the processing device 51 in the facility 50 illustrated in FIG. 1, through the signal line 35 and the communication device 25.

The IMU 33 detects movement and attitude of the excavator 1. The movement of the excavator 1 includes at least one of movement of the upper swing body 3 and movement of the travel unit 5. The attitude of the excavator 1 can be represented by a roll angle, a pitch angle, and a yaw angle of the excavator 1. According to an embodiment, the IMU 33 detects and outputs an angular velocity and an acceleration of the excavator 1.

<About Coordinate Systems>

Figure 4:
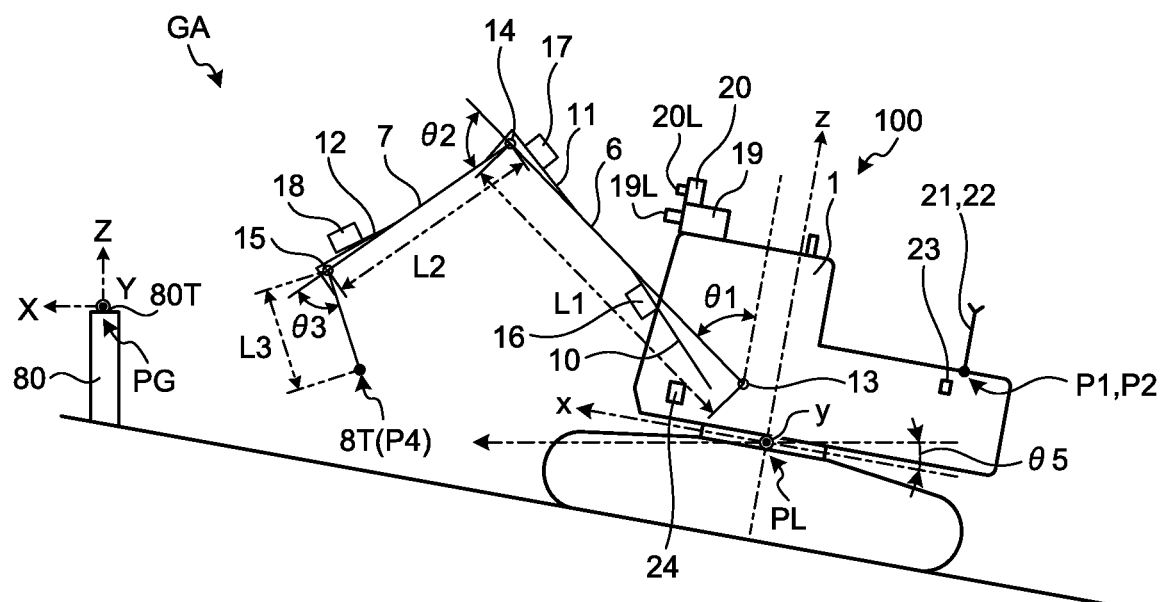
FIG. 4 is a diagram illustrating coordinate systems in an image display system and a remote operation system according to an embodiment.
Figure 5:
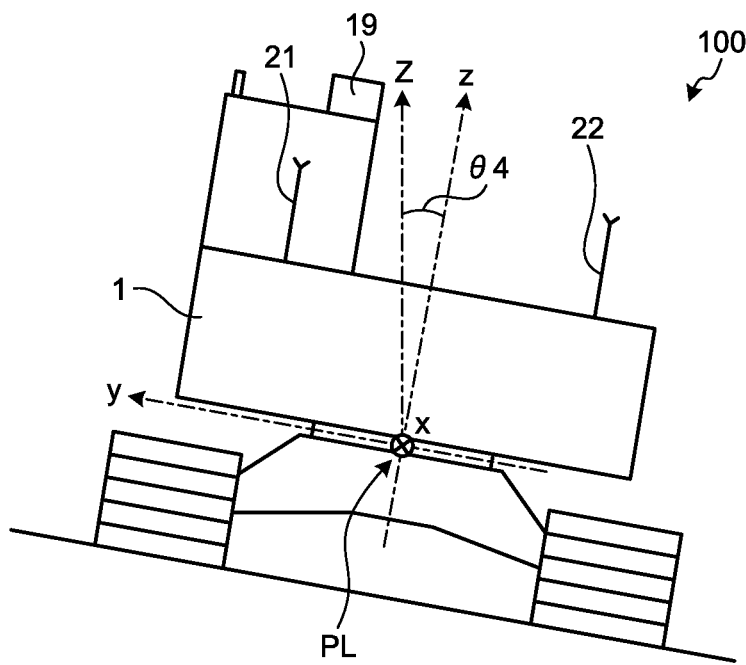
FIG. 5 is a back view of an excavator.
Figure 6:
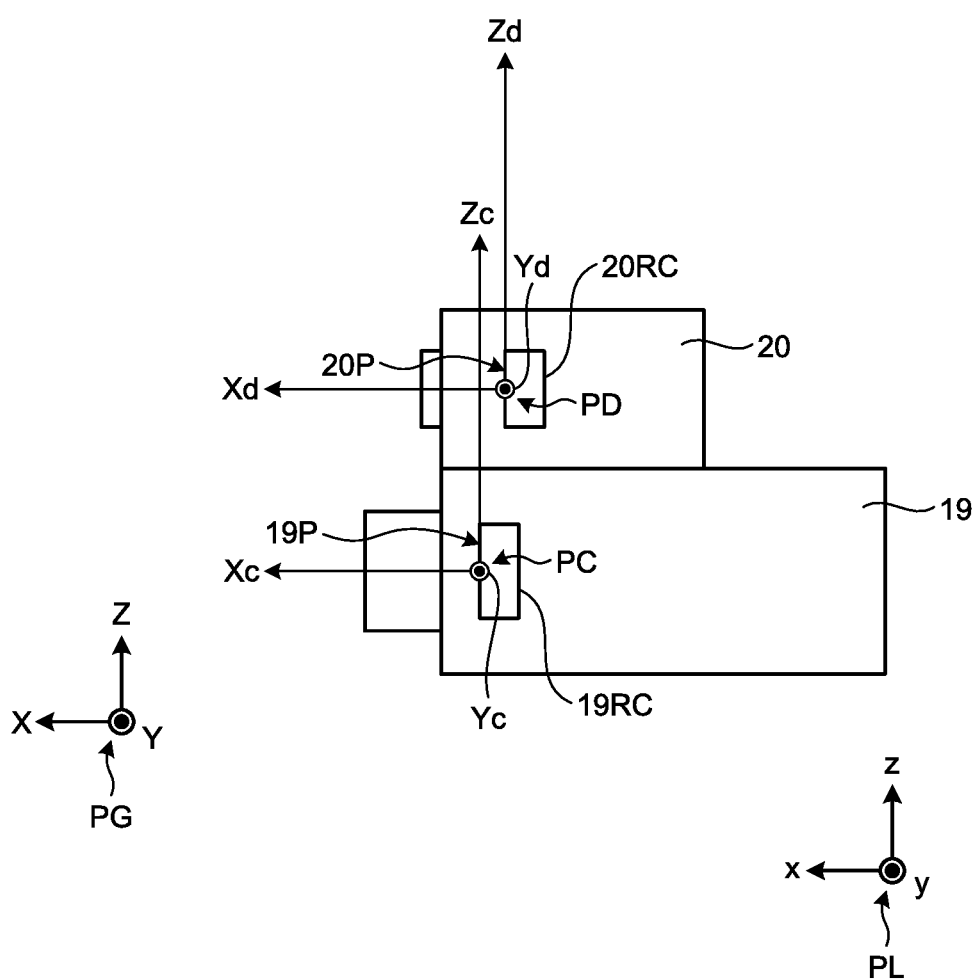
FIG. 6 is a diagram illustrating coordinate systems of an imaging device and a distance detection device.

FIG. 4 is a diagram illustrating coordinate systems in the image display system 100 and the remote operation system 101 according to an embodiment. FIG. 5 is a back view of the excavator 1. FIG. 6 is a diagram illustrating coordinate systems of the imaging device and the distance detection device. In the image display system 100 and the remote operation system 101, there are a global coordinate system, a local coordinate system, a coordinate system of the imaging device 19, and a coordinate system of the distance detection device 20. According to an embodiment, the global coordinate system represents, for example, a coordinate system in the GNSS. The global coordinate system is a three-dimensional coordinate system representing a position by (X,Y,Z), for example, with a reference position PG of a reference pile 80, set in a work section GA of the excavator 1 as a reference. As illustrated in FIG. 5, the reference position PG is located, for example, at a tip 80T of the reference pile 80 set in the work section GA.

The local coordinate system is a three-dimensional coordinate system representing a position by (x,y,z) with the excavator 1 as a reference. According to an embodiment, an origin position PL of the local coordinate system is an intersection between a z axis as the rotation center axis of the upper swing body 3, and a plane orthogonal to the z axis within a swing circle of the upper swing body 3, but the origin position PL is not limited thereto. The plane orthogonal to the z axis within the swing circle may be a plane passing through the center of the swing circle in the z axis direction.

According to an embodiment, as illustrated in FIG. 6, the coordinate system of the imaging device 19 is a three-dimensional coordinate system representing a position by (Xc,Yc,Zc), with the center of a light receiving surface 19P of an imaging element 19RC as an origin PC. According to an embodiment, as illustrated in FIG. 6, the coordinate system of the distance detection device 20 is a three-dimensional coordinate system representing a position by (Xd,Yd,Zd) with the center of a light receiving surface 20P of a distance detection element 20RC as an origin PD.

<Attitude of Excavator 1>

As illustrated in FIG. 5, an inclination angle θ4 relative to the right-and-left direction, that is, the width direction of the upper swing body 3 is the roll angle of the excavator 1, an inclination angle θ5 relative to the front-back direction of the upper swing body 3 is the pitch angle of the excavator 1, and an angle of the upper swing body 3 about the z axis is the yaw angle of the excavator 1. The roll angle is determined by integrating an angular velocity about the x axis detected by the IMU 33 with respect to time, the pitch angle is determined by integrating an angular velocity about the y axis detected by the IMU 33 with respect to time, and the yaw angle is determined by integrating an angular velocity about the z axis detected by the IMU 33 with respect to time. The angular velocity about the z axis is a swing angular velocity ω of the excavator 1. In other words, the yaw angle of the excavator 1, more specifically, the yaw angle of the upper swing body 3 can be obtained by integrating the swing angular velocity co with respect to time.

The acceleration and the angular velocity detected by the IMU 33 are output as movement information to the sensor controller 26. The sensor controller 26 performs processing such as filtering and integration on the movement information acquired from the IMU 33 to determine the inclination angle θ4 as the roll angle, the inclination angle θ5 as the pitch angle, and the yaw angle. The sensor controller 26 transmits the determined inclination angle θ4, inclination angle θ5, and the yaw angle, as information relating to an attitude of the excavator 1, to the processing device 51 in the facility 50 illustrated in FIG. 1, through the signal line 35 and the communication device 25 illustrated in FIG. 3.

As described above, the sensor controller 26 determines information representing an attitude of the working unit 2. Specifically, the information representing an attitude of the working unit 2 is the inclination angle θ1 of the boom 6 relative to the direction (z-axis direction) orthogonal to a horizontal plane in the local coordinate system, the inclination angle θ2 of the arm 7 relative to the boom 6, and the inclination angle θ3 of the bucket 8 relative to the arm 7. The processing device 51 in the facility 50 illustrated in FIG. 1 calculates a position P4 of a tooth point 8T of the bucket 8 (hereinafter appropriately referred to as tooth point position), on the basis of information representing an attitude of the working unit 2 acquired from the sensor controller 26 of the excavator 1, that is, the inclination angles θ1, θ2, and θ3.

The storage unit 51M of the processing device 51 stores data of the working unit 2 (hereinafter appropriately referred to as working unit data). The working unit data includes a length L1 of the boom 6, a length L2 of the arm 7, and a length L3 of the bucket 8. As illustrated in FIG. 4, the length L1 of the boom 6 corresponds to a length from the boom pin 13 to the arm pin 14. The length L2 of the arm 7 corresponds to a length from the arm pin 14 to the bucket pin 15. The length L3 of the bucket 8 corresponds to a length from the bucket pin 15 to the tooth point 8T of the bucket 8. The tooth point 8T represents a tip of a tooth 8B illustrated in FIG. 2. In addition, the working unit data includes information about position of the boom pin 13 relative to the origin position PL of the local coordinate system. The processing device 51 can use the lengths L1, L2, and L3, the inclination angles θ1, θ2, and θ3, and the origin position PL to determine the tooth point position P4 with respect to the origin position PL. According to an embodiment, the processing device 51 in the facility 50 determines the tooth point position P4, but the sensor controller 26 of the excavator 1 may determine the tooth point position P4 and transmit the tooth point position P4 to the processing device 51 in the facility 50.

<Example of Control Executed By Image Display System 100 and Remote Operation System 101>

Figure 7:
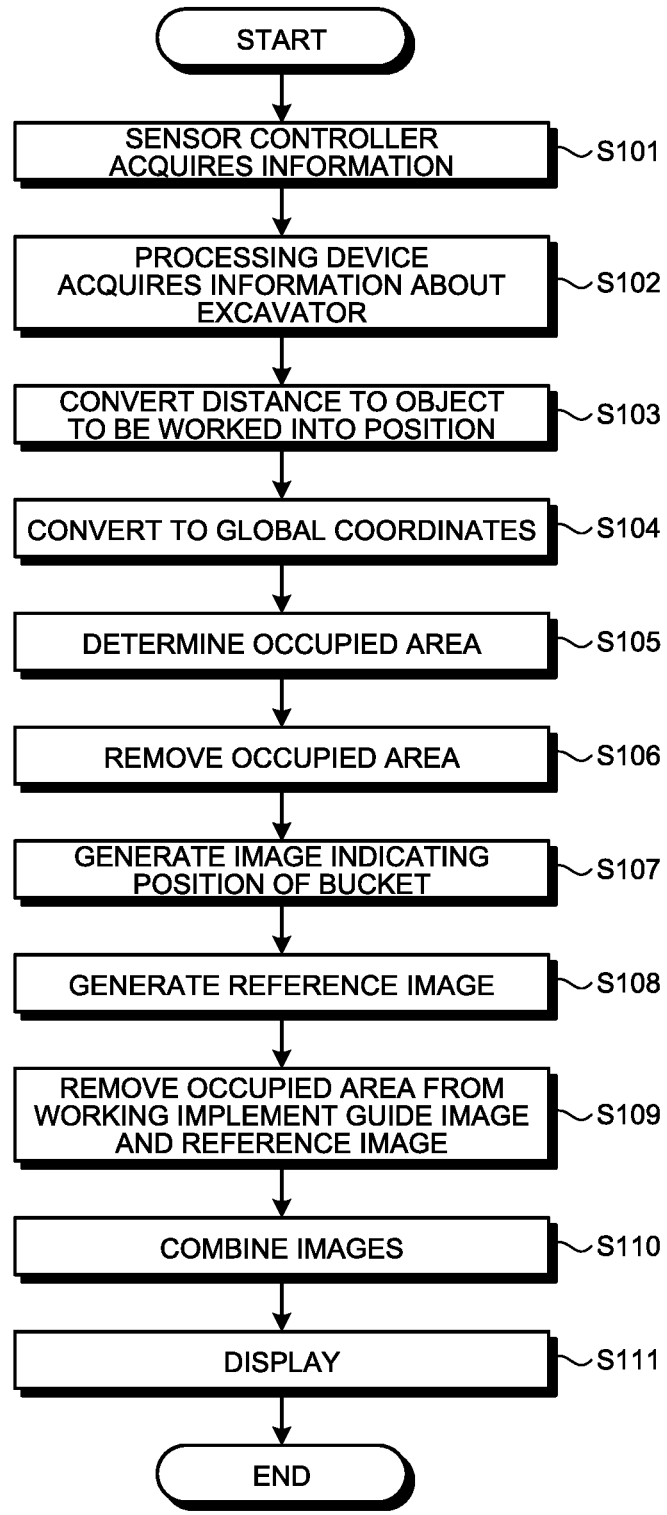
FIG. 7 is a flowchart of an example of control performed by an image display system and a remote operation system.
Figure 8:
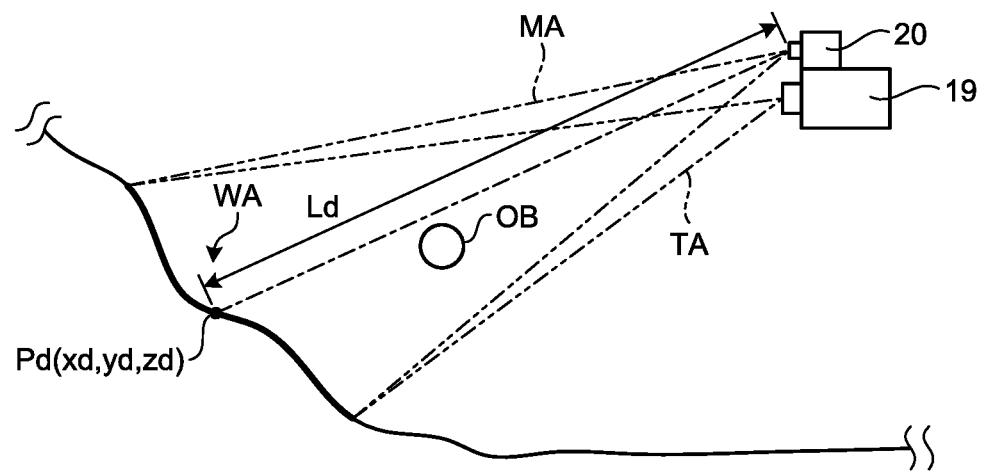
FIG. 8 is a diagram illustrating an imaging device, a distance detection device, and an object to be worked.

FIG. 7 is a flowchart of an example of control performed by the image display system 100 and the remote operation system 101. FIG. 8 is a diagram illustrating the imaging device 19, the distance detection device 20, and the object WA to be worked.

In Step S101, the sensor controller 26 illustrated in FIG. 3 acquires information about the excavator 1. The information about the excavator 1 is information obtained from the imaging device 19, the distance detection device 20, the global position calculation device 23, the attitude detection device 32, and the IMU 33. As illustrated in FIG. 8, the imaging device 19 images the object WA to be worked within an imaging range TA, and obtains an image of the object WA to be worked. The distance detection device 20 detects distances Ld from the distance detection device 20 to the object WA to be worked and another object within a detection range MA. The global position calculation device 23 determines the reference position information Pga1 and Pga2 corresponding to the positions P1 and P2 of the GNSS antennas 21 and 22 in the global coordinate system. The attitude detection device 32 detects the boom cylinder length, the arm cylinder length, and the bucket cylinder length. The IMU 33 detects an attitude of the excavator 1, more specifically, the roll angle θ4, the pitch angle θ5, and the yaw angle of the upper swing body 3.

In Step S102, the processing device 51 of the image display system 100 and the remote operation system 101 acquires information about the excavator 1, from the sensor controller 26 of the excavator 1, through the communication device 25 of the excavator 1 and the communication device 54 connected to the processing device 51.

The information about the excavator 1 which is acquired from the sensor controller 26 by the processing device 51 includes an image of the object WA to be worked which is imaged by the imaging device 19, information about the distance from the distance detection device 20 to the object WA to be worked which is detected by the distance detection device 20, information about an attitude of the working unit 2 of the excavator 1 which is detected by the attitude detection device 32, the reference position information Pga1 and Pga2, and information about an attitude of the excavator 1.

The information about the distance from the distance detection device 20 to the object WA to be worked includes a distance Ld to the object WA to be worked or an object OB within the detection range MA, and information about orientation of a position Pd corresponding to the distance Ld. In FIG. 8, the distance Ld is illustrated as the distance to the object WA to be worked. The information about the orientation of the position Pd represents an orientation of the position Pd with the distance detection device 20 as a reference, and angles relative to axes Xd, Yd, and Zd of the coordinate system of the distance detection device 20. The information about an attitude of the working unit 2 which is acquired by the processing device 51 represents the inclination angles θ1, θ2, and θ3 of the working unit 2 which are determined by the sensor controller 26, using the boom cylinder length, the arm cylinder length, and the bucket cylinder length.

The information about an attitude of the excavator 1 represents the roll angle θ4, the pitch angle θ5, and the yaw angle of the excavator 1, more specifically, the upper swing body 3.

The processing device 51 uses the inclination angles θ1, θ2, and θ3 of the working unit 2 which are acquired from the sensor controller 26, and the length L1 of the boom 6, the length L2 of the arm 7, and the length L3 of the bucket 8 which are stored in the storage unit 51M to determine the tooth point position P4 of the bucket 8.

The tooth point position P4 of the bucket 8 is a set of coordinates in the local coordinate system (x,y,z) of the excavator 1.

In Step S103, the processing device 51 uses the information about distance to the object WA to be worked to convert the distance Ld to the object WA to be worked into information about position. The information about position represents coordinates of the position Pd in the coordinate system (Xd,Yd,Zd) of the distance detection device 20. In Step S103, all distances Ld within the detection range MA which are detected by the distance detection device 20 are converted into the information about position. The processing device 51 uses the distance Ld and the information about orientation of the position Pd corresponding to the distance Ld to convert the distance Ld into the information about position. In Step S103, the distance to the object OB within the detection range MA is also converted to the information about position, as in the distance Ld of the object WA to be worked. At Step S103, information of the information about position of the object WA to be worked within the detection range MA is obtained. From the information of the information about position of the object WA to be worked, information about terrain of the object WA to be worked can be obtained.

The information about position of and information about terrain of the object WA to be worked is a set of coordinates of the positions Pd in the coordinate system (Xd,Yd,Zd) of the distance detection device 20. After converting the information about terrain of the object WA to be worked into values of the coordinate system (Xc,Yc,Zc) of the imaging device 19, the processing device 51 converts the values into values of the local coordinate system (x,y,z) of the excavator 1.

In Step S104, the processing device 51 converts the information about position of the object WA to be worked, the tooth point position P4 of the bucket 8, and the reference position information Pga1 and Pga2 which are acquired from the sensor controller 26 of the excavator 1, into the global coordinate system (X,Y,Z). For conversion to the global coordinate system (X,Y,Z), the processing device 51 generates a rotation matrix using the roll angle v4, the pitch angle θ5, and the yaw angle of the excavator 1, which are acquired from the sensor controller 26. The processing device 51 uses the generated rotation matrix to convert the information about position of the object WA to be worked, the tooth point position P4 of the bucket 8, and the reference position information Pga1 and Pga2, into the global coordinate system (X,Y,Z). Next, in Step S105, the processing device 51 determines an occupied area.

Figure 9:
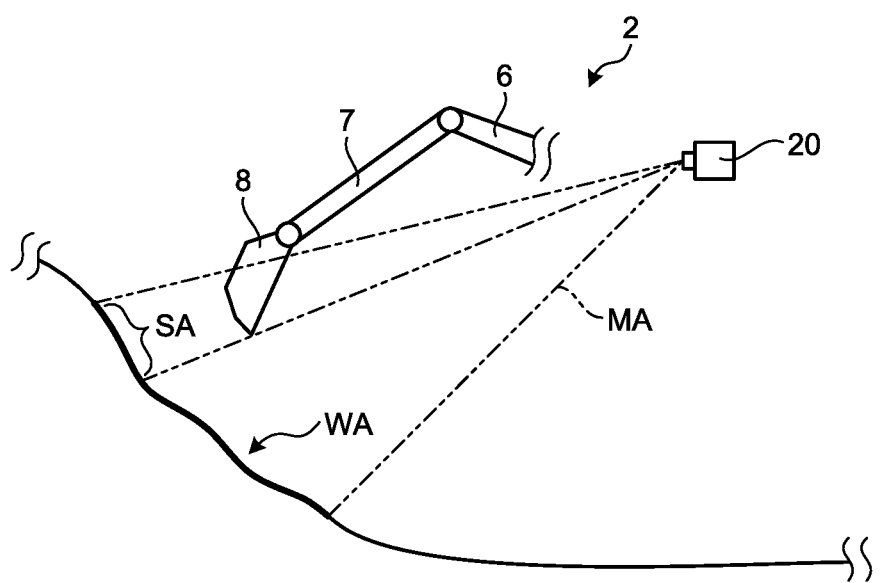
FIG. 9 is a diagram illustrating an occupied area.

FIG. 9 is a diagram illustrating an occupied area SA. The occupied area SA is an area occupied by the working unit 2 in the information about terrain of the object WA to be worked. In an example illustrated in FIG. 9, part of the bucket 8 of the working unit 2 is within the detection range MA of the distance detection device 20, and between the distance detection device 20 and the object WA to be worked. Therefore, in the portion of the occupied area SA, the distance detection device 20 detects a distance to the bucket 8, instead of the distance to the object WA to be worked According to an embodiment, the processing device 51 removes the portion of the occupied area SA, from the information about terrain of the object WA to be worked which is obtained in Step S103.

The processing device 51 causes, for example, the storage unit 51M to store information of at least one of a position and attitude detected by the distance detection device 20 according to at least one of a position and attitude of the bucket 8. Such information is included in the attitude of the working unit 2 of the excavator 1 in the present embodiment. An attitude of the working unit 2 is determined by using the inclination angles θ1, θ2, and θ3 of the working unit 2, the length L1 of the boom 6, the length L2 of the arm 7, the length L3 of the bucket 8, and the attitude of the excavator 1 if necessary. Then, the processing device 51 compares data detected by the distance detection device 20 with information stored in the storage unit 51M, and determines detection of the bucket 8 when both match. Owing to such processing using the attitude of the working unit 2, the processing device 51 uses no information about the bucket 8 in the occupied area SA, for generation of the grid image 65 illustrated in FIG. 1, and the grid image 65 can be generated accurately.

In order to remove the portion of the occupied area SA, the processing using the attitude of the working unit 2 may be performed as follows. Information about at least one of the position and attitude of the bucket 8 in the global coordinate system, which is included in the attitude of the work unit 2, can be determined on the basis of the inclination angles θ1, θ2, and θ3 of the working unit 2, the length L1 of the boom 6, the length L2 of the arm 7, and the length L3 of the bucket 8. In Steps S103 and S104, information about terrain of the object WA to be worked in the global coordinate system has been obtained.

Figure 10:
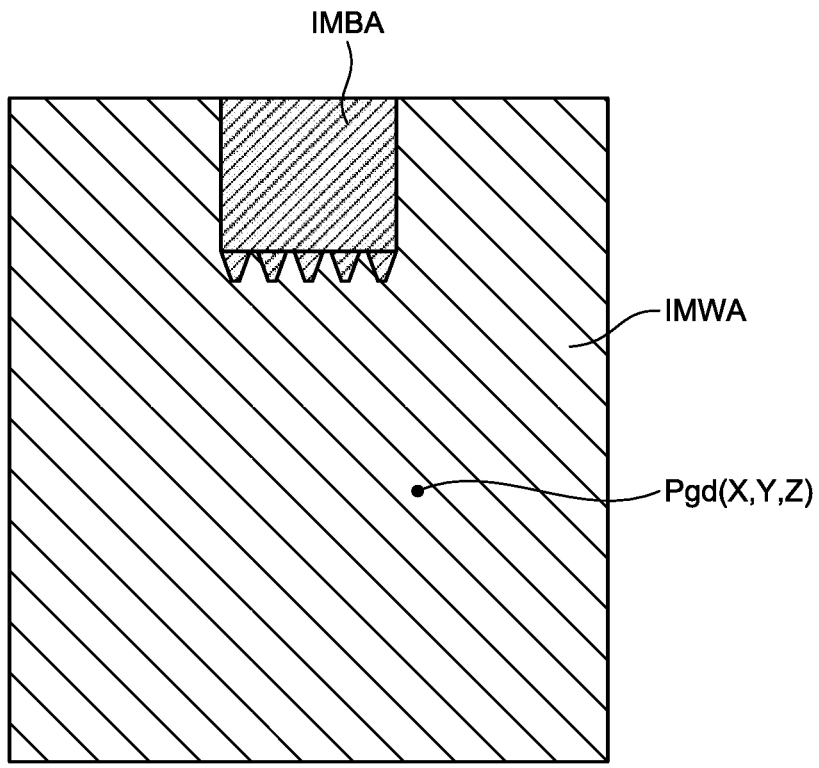
FIG. 10 is a diagram illustrating information about terrain of an object to be worked from which an occupied area is removed.

In Step S106, the processing device 51 removes, as the occupied area SA, an area in which the position of the bucket 8 is projected on the information about terrain of the object WA to be worked, from the shape of the object WA to be worked, FIG. 10 is a diagram illustrating information about terrain of the object WA to be worked from which an occupied area is removed. Information IMWA about terrain of the object WA to be worked is a set of coordinates Pgd (X,Y,Z) in the global coordinate system (X,Y,Z). After the processing in Step S106, there is no coordinate information in an occupied area IMBA. Next, in Step S107, the processing device 51 generates an image indicating the position of the bucket 8. An image indicating the position of the bucket 8 is an image of a portion corresponding to the bucket 8 on the object WA to be worked.

Figure 11:
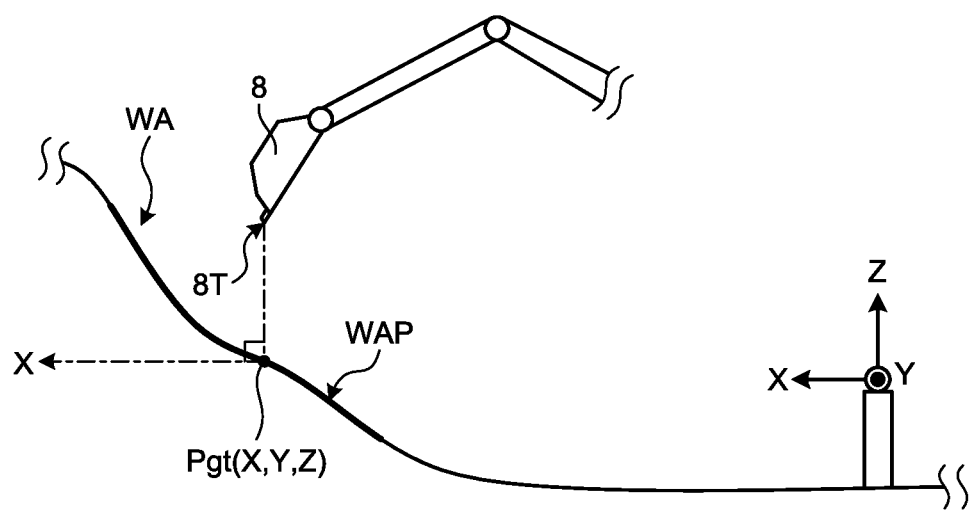
FIG. 11 is a diagram illustrating an image indicating a position of a bucket on an object to be worked.
Figure 12:
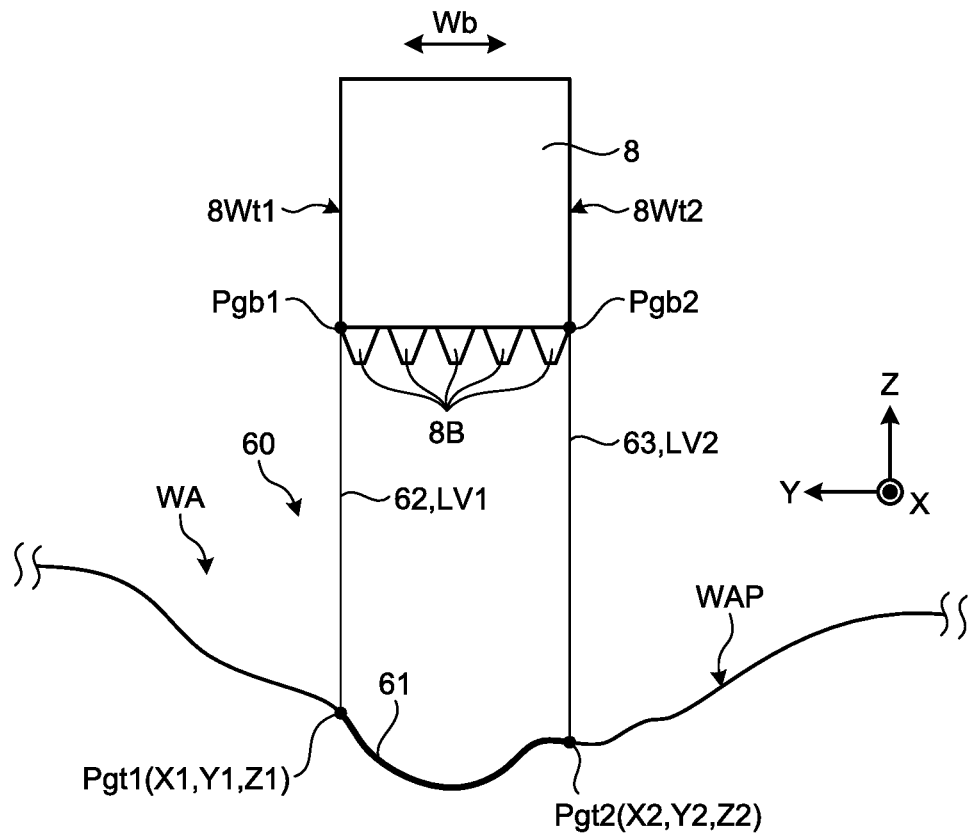
FIG. 12 is a diagram illustrating an image indicating a position of a bucket on an object to be worked.
Figure 13:
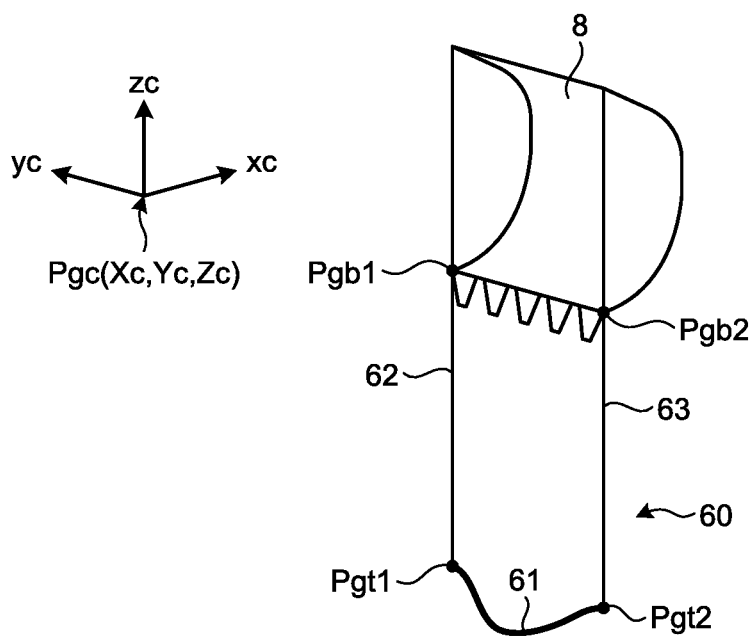
FIG. 13 is a diagram illustrating an image indicating a position of a bucket on an object to be worked.

FIGS. 11 to 13 are diagrams illustrating images indicating the position of the bucket 8 on the object WA to be worked. According to an embodiment, the image indicating the position of the bucket 8 is an image indicating the position of the tooth point 8T of the bucket 8 on the object WA to be worked. In the following description, the image indicating the position of the tooth point 8T of the bucket 8 is appropriately referred to as tooth point position image. As illustrated in FIG. 11, the tooth point position image is an image defined by a position Pgt (X,Y,Z) on a surface WAP of the object WA to be worked, where the tooth point 8T is projected onto the object WA to be worked, in a vertical direction, that is, in a direction in which gravity acts. The vertical direction is the Z direction in the global coordinate system (X,Y,Z), and is a direction orthogonal to an X direction and a Y direction.

As illustrated in FIG. 12, between a first position Pgt1 (X1,Y1,Z1) and a second position Pgt2 (X2,Y2,Z2) on the front surface WAP of the object WA to be worked, a line image along the surface WAP of the object WA to be worked is formed as a tooth point position image 61. The first position Pgt1 (X1,Y1,Z1) is an intersection between a straight line LV1 and the surface WAP of the object WA to be worked. The straight line LV1 is vertically extended from a position Pgb1 on the outside of a tooth 8B at one end 8Wt1 in a width direction Wb of the bucket 8. The second position Pgt2 (X2,Y2,Z2) is an intersection between a straight line LV2 and the surface WAP of the object WA to be worked. The straight line LV2 is vertically extended from a position Pgb2 on the outside of a tooth 8B at the other end 8Wt2 in a width direction Wb of the bucket 8. The width direction Wb of the bucket 8 is a direction in which the plurality of teeth 8B is arranged.

The processing device 51 determines the straight line LV1 and the straight line LV2 respectively extending vertically from the position Pgb1 and the position Pgb2 of the bucket 8. Next, the processing device 51 determines the first position Pgt1 (X1,Y1,Z1) and the second position Pgt2 (X2,Y2,Z2), on the basis of the obtained straight line LV1 and straight line LV2, and the information about terrain of the object WA to be worked. Then, the processing device 51 defines a set of positions Pgt on the surface WAP of the object WA to be worked, as the tooth point position image 61. The positions Pgt are obtained upon projecting a straight line connecting the first position Pgt1 and the second position Pgt2 onto the surface WAP.

According to an embodiment, the processing device 51 generates a first straight line image 62 as an image of the straight line LV1 connecting the position Pgb1 and the first position Pgt1 (X1,Y1,Z1), and a second straight line image 63 as an image of the straight line LV2 connecting the position Pgb2 and the second position Pgt2 (X2,Y2,Z2). Next, the processing device 51 converts the tooth point position image 61, the first straight line image 62, and the second straight line image 63 into an image captured with the imaging device 19 as the reference, that is, an image viewed from the imaging device 19.

As illustrated in FIG. 13, the image viewed from the imaging device 19 is an image representing the tooth point position image 61, the first straight line image 62, and the second straight line image 63, viewed from the origin Pgc (Xc,Yc,Zc) of the imaging device in the global coordinate system (X,Y,Z). The origin Pgc (Xc,Yc,Zc) of the imaging device is coordinates obtained by converting the center of the light receiving surface 19P of the imaging element 19RC included in the imaging device 19, that is, the origin PC, into the global coordinate system (X,Y,Z).

The tooth point position image 61, the first straight line image 62, and the second straight line image 63 are images in a three-dimensional space, but the image viewed from the imaging device 19 is a two-dimensional image. Therefore, the processing device 51 performs perspective projection to project the tooth point position image 61, the first straight line image 62, and the second straight line image 63, which are defined in the three-dimensional space, that is, in the global coordinate system (X,Y,Z), on a two-dimensional plane. The tooth point position image 61, the first straight line image 62, and the second straight line image 63 which are converted into images viewed from the imaging device 19 are appropriately referred to as a working implement guide image 60, in the following description.

Figure 14:
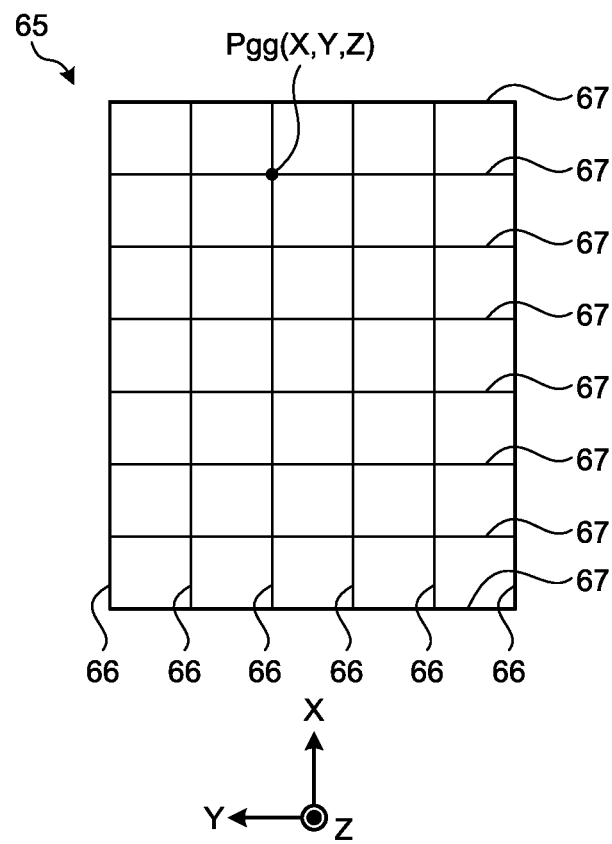
FIG. 14 is a diagram illustrating a grid image as a reference image.
Figure 15:
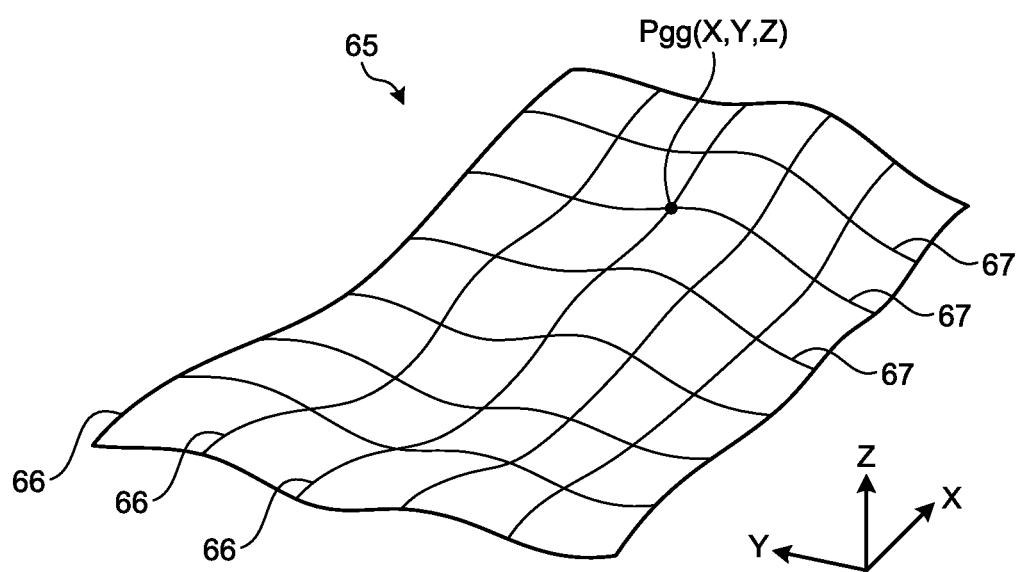
FIG. 15 is a diagram illustrating a grid image as a reference image.

FIGS. 14 and 15 are diagrams illustrating grid images 65 as reference images. When the working implement guide image 60 is generated, the processing device 51 proceeds to Step S108 and generates the grid image 65 as the reference image. The grid image 65 is a line image along the surface WAP of the object WA to be worked, which is generated using the information about position of the object WA to be worked. The grid image 65 includes grids having a plurality of first line images 66 and a plurality of second line images 67 crossing the plurality of first line images 66. According to an embodiment, a first line image 66 is, for example, a line image extending in parallel with the X direction in the global coordinate system (X,Y,Z) and arranged in the Y direction. In the global coordinate system (X,Y,Z), the first line image 66 may be a line image extending in parallel with the front-back direction of the upper swing body 3 included in the excavator 1, and arranged in the width direction of the upper swing body 3.

The grid image 65 is generated using the information about position of the object WA to be worked, more specifically, a position Pgg (X,Y,Z) on the surface WAP. An intersection between a first line image 66 and a second line image 67 is a position Pgg (X,Y,Z). As illustrated in FIG. 15, the first line image 66 and the second line image 67 are defined by the global coordinate system (X,Y,Z), and thus include three-dimensional information. According to an embodiment, the plurality of first line images 66 is arranged at equal intervals, and the plurality of second line images 67 is arranged at equal intervals. An interval between adjacent first line images 66 is equal to an interval between adjacent second line images 67.

The grid image 65 is an image obtained by converting a first line image 66 and a second line image 67 generated using a position Pgg (X,Y,Z) on the surface WAP, into an image viewed from the imaging device 19. After generating the first line images 66 and the second line images 67, the processing device 51 converts them to the image viewed from the imaging device 19 to generate the grid image 65. The first line images 66 and the second line images 67 are converted into the image viewed from the imaging device 19 to assist an absolute distance of the object WA to be worked, and the grid image 65 having an equal interval on a horizontal plane can be deformed and displayed according to the terrain of the object WA to be worked.

Next, in Step S109, the processing device 51 removes the occupied area SA from the generated working implement guide image 60 and grid image 65 as the reference image. In Step S109, the processing device 51 converts the occupied area SA into the image viewed from the imaging device 19, and removes the occupied area SA from the working implement guide image 60 and the grid image 65 as the reference image. According to an embodiment, the processing device 51 may remove the occupied area SA before being converted to the image viewed from the imaging device 19, from the tooth point position image 61, the first straight line image 62, and the second straight line image 63 before being converted into the image viewed from the imaging device 19, and the first line image 66 and the second line image 67 before being converted to the image viewed from the imaging device 19.

Figure 16:
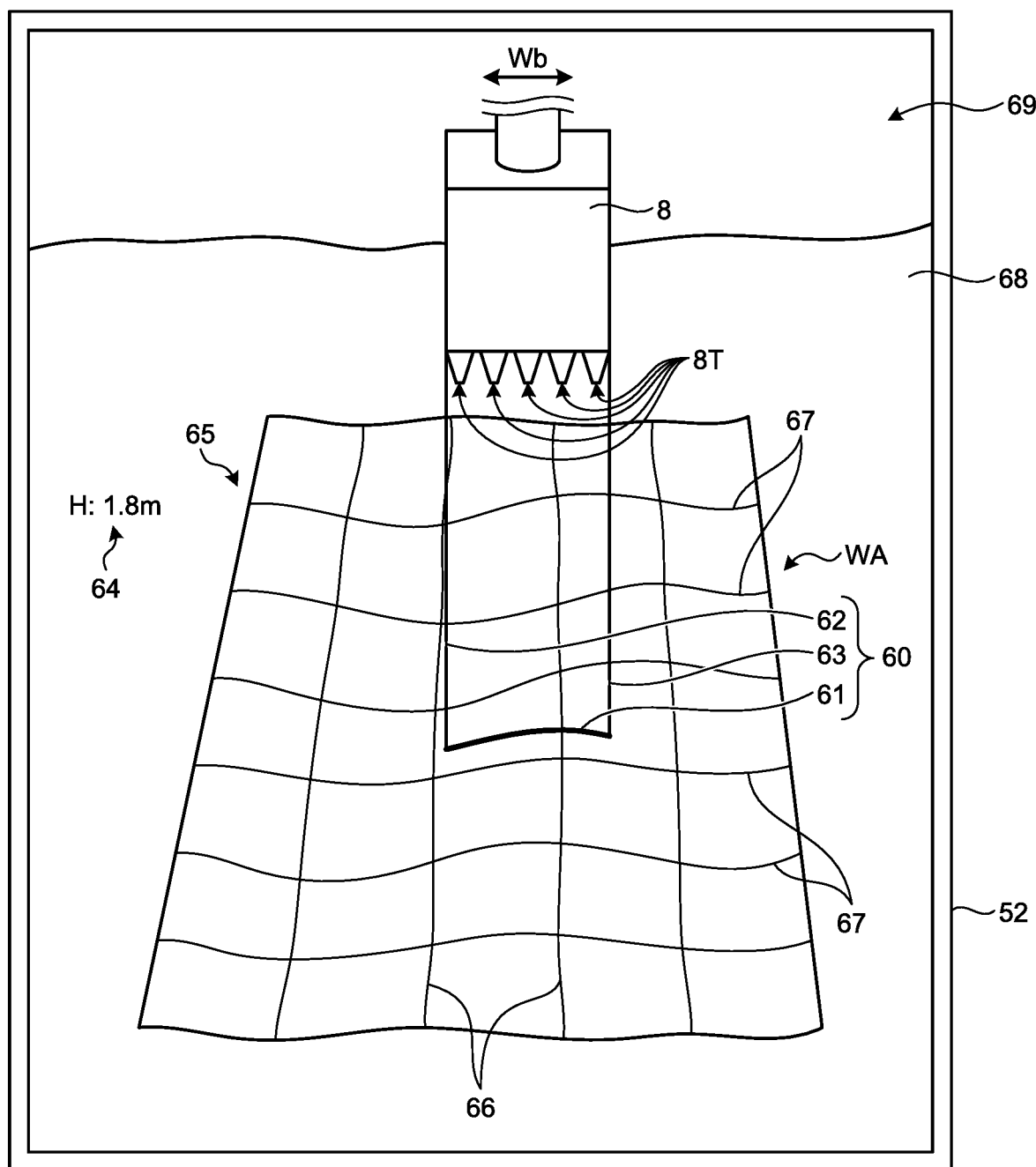
FIG. 16 is a diagram illustrating a work image.

FIG. 16 is a diagram illustrating the work image 69. In Step S110, the processing device 51 combines the working implement guide image 60 from which the occupied area SA is removed, the grid image 65, and the image 68 of the object WA to be worked which is captured by the imaging device 19 to generate the work image 69. In Step S111, the processing device 51 displays the generated work image 68 on the display device 52. The work image 69 is an image in which the grid image 65 and the working implement guide image 60 are displayed on the image 68 of the object WA to be worked.

Since the grid image 65 has a grid along the surface WAP of the object WA to be worked, the operator of the excavator 1 can grasp the position of the object WA to be worked by referring to the grid image 65. For example, owing to the second line images 67, the operator can grasp the depth, that is, a position in a front-back direction of the upper swing body 3 included in the excavator 1, and can grasp a position in a width direction of the bucket 8, owing to the first line images 66.

In the working implement guide image 60, the tooth point position image 61 is displayed along the surface WAP of the object WA to be worked, and the grid image 65. Therefore, the operator can grasp a positional relationship between the bucket 8 and the object WA to be worked, on the basis of the grid image 65 and the tooth point position image 61, so that the working efficiency and the working accuracy are improved. According to an embodiment, the first straight line image 62 and the second straight line image 63 are extended from both sides of the width direction Wb of the bucket 8, and connect both ends of the tooth point position image 61. The operator can more easily grasp the positional relationship between the bucket 8 and the object WA to be worked, on the basis of the first straight line image 62 and the second straight line image 63. Since the grid image 65 and the tooth point position image 61 are displayed along a terrain to be worked (object WA to be worked), a relative positional relationship between the bucket 8 and the object WA to be worked can be more easily grasped, on a terrain surface (two-dimensionally). Furthermore, arrangement of the first line images 66 and the second line images 67 constituting the grid image 65, at equal intervals in the global coordinate system, facilitates grasping a sense of distance on the terrain surface, and a sense of perspective.

According to an embodiment, the work image 69 includes information 64 representing a distance between a tooth point 8T of the bucket 8 and the object WA to be worked. Such configuration enables the operator to advantageously grasp the actual distance between a tooth point 8T of the bucket 8 and the object WA to be worked. The distance between a tooth point 8T of the bucket 8 and the object WA to be worked can be the distance from a tooth point 8T at the center in the width direction Wb of the bucket 8 to the surface WAP of the object WA to be worked.

The information 64 is preferably spatial position information about the working implement or the object W to be worked, including information, such as information about attitude, such as the angle of the bucket 8, information representing a relative distance between the bucket 8 and the object WA to be worked, information representing a relationship between a direction of, for example, a tooth point 8T of the bucket 8 and the direction of the surface of the object WA to be worked, information representing the position of the bucket 8 by coordinates, information representing the direction of the surface of the object WA to be worked, or information representing the distance from the imaging device 19 to a tooth point 8T of the bucket 8 in the x direction in the local coordinate system, in spite of or in addition to the distance between a tooth point 8T of the bucket 8 and the object WA to be worked.

That is, the processing device 51 may determine at least one of the position of the bucket 8 as the working implement, the attitude of the bucket 8, the position of the object WA to be worked, a relative attitude of the object WA to be worked, a relative distance between the bucket 8 and the object WA to be worked, and a relative attitude of the bucket 8 and the object WA to be worked to be displayed on the display device 52.

As described above, the image display system 100 and the remote operation system 101 superpose the working implement guide image 60 and the grid image 65 generated to be viewed from the imaging device 19 on the image 68 of an actual object WA to be worked imaged by the imaging device 19 and display the images on the display device 52. As a result of such processing, the image display system 100 and the remote operation system 101 can be configured so that the operator remotely operating the excavator 1 using an image of the object WA to be worked displayed on the display device 52 can readily grasp a positional relationship between the position of the bucket 8 and the object WA to be worked, and working efficiency and working accuracy can be improved. An inexperienced operator can easily grasp positional relationship between the position of the bucket 8 and the object WA to be worked by using the image display system 100 and the remote operation system 101. As a result, reduction in working efficiency or working accuracy can be prevented. In addition, the image display system 100 and the remote operation system 101 superpose the working implement guide image 60, the grid image 65, and the image 68 of the actual object WA to be worked, and display the images on the display device 52. Therefore, a single screen to which the operator pays attention is required, and working efficiency can be improved.

In the grid image 65, the interval between adjacent first line images 66 is equal to the interval between adjacent second line images 67. Therefore, the grid image 65, and the image 68 of the actual object WA to be worked imaged by the imaging device 19 are mutually superposed and displayed for facilitating grasping a working point on the object WA to be worked. In addition, superposition of the tooth point position image 61 of the working implement guide image 60 and the grid image 65 enables the operator to readily grasp a movement distance of the bucket 8, so that working efficiency is improved.

Since the occupied area SA as an area of the working unit 2 is removed from the working implement guide image 60 and the grid image 65, the working implement guide image 60 and the grid image 65 can be prevented from being distorted by the occupied area SA, and the working implement guide image 60 and the grid image 65 can be prevented from being mutually superposed and displayed on the working unit 2 As a result, the image display system 100 and the remote operation system 101 can display, on the display device 52, the work image 69 having a visible form for the operator.

According to an embodiment, the working implement guide image 60 preferably includes at least the tooth point position image 61. The grid image 65 preferably includes at least a plurality of second line images 67, that is, a plurality of line images indicating a direction orthogonal to the front-back direction of the upper swing body 3 included in the excavator 1. Further, the processing device 51 may change, for example, a color of the tooth point position image 61 of the working implement guide image 60, according to a distance between a tooth point 8T of the bucket 8 and the object WA to be worked. In this way, the operator can easily grasp the position of the bucket 8 and the distance between the bucket 8 and the object WA to be worked.

In an embodiment, the processing device 51 converts the information about terrain of the object WA to be worked into the global coordinate system (X,Y,Z) to generate the working implement guide image 60 and the grid image 65, but the information about terrain of the object WA to be worked may not be converted into the global coordinate system (X,Y,Z). In this case, the processing device 51 handles the information about terrain of the object WA to be worked in the local coordinate system (x,y,z) of the excavator 1, and generates the working implement guide image 60 and the grid image 65. When the information about terrain of the object WA to be worked is handled in the local coordinate system (x,y,z) of the excavator 1, the GNSS antennas 21 and 22 and the global position calculation device 23 can be eliminated.

In the embodiment described above, part of the excavator 1 (e.g., the bucket 8 as described above) detected by the distance detection device 20 is removed to obtain the information about terrain of the object WA to be worked (three-dimensional terrain data). However, when the three-dimensional terrain data acquired in the past (e.g., a few seconds ago) is stored in the storage unit 51M of the processing device 51, and the processing unit 51P of the processing device 51 determines that the current position of the object WA to be worked and the position indicated by the stored three-dimensional data are identical to each other, the past three-dimensional terrain data may be used to display the grid image 65. That is, even when there is a terrain hidden by the part of the excavator 1 as viewed from the imaging device 19, past three-dimensional terrain data allows the processing device 51 to display the grid image 65.

Furthermore, a grid image 65 using a local coordinate system as a polar coordinate system may be displayed, instead of displaying the grid image 65 using the grids. Specifically, concentric circle line images (second line images) and radial line images (first line images) may be drawn. The concentric circle line images are arranged at equal intervals according to the distance from the center of the excavator 1 (e.g., a swing center of the upper swing body 3), and the radial line images are arranged at equal intervals from the swing center according to a swing angle of the upper swing body 3. In this configuration, a second line image as a concentric circle line image intersects a first line image as a radial line image about the swing center. As described above, displaying such a grid image also facilitates grasping the positional relationship between the position of the bucket 8 and the object WA to be worked during swing or excavation.

<Tooth Point Position Image 61 of Working Unit 2a As Loading Excavator>

Figure 17:
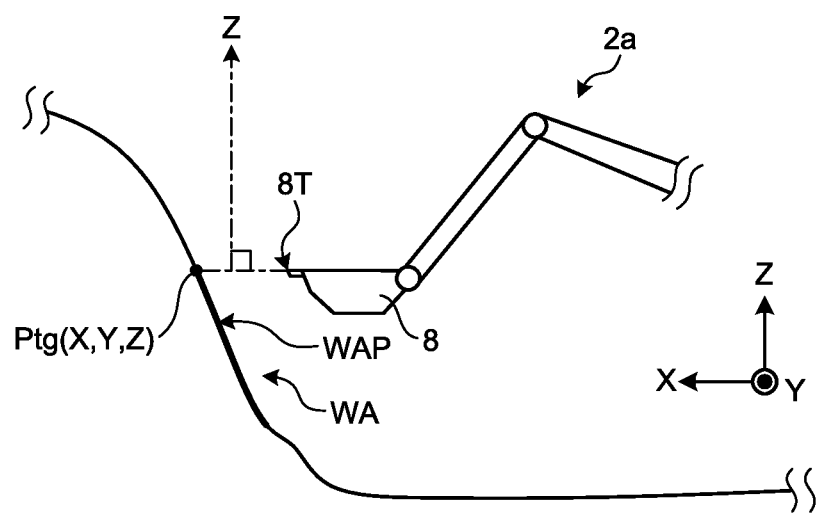
FIG. 17 is a diagram illustrating a tooth point position image where a working unit as a loading excavator is used.

FIG. 17 is a diagram illustrating a tooth point position image 61 where a working unit 2a as a loading excavator is used. A loading shovel has the bucket 8 turning from the rear side to the front side of the excavator 1 to scoop earth and sand. In the working unit 2a as the loading excavator, the tooth point 8T of the bucket 8 is directed forward from the upper swing body 3, and excavates the object WA to be worked as the object to be worked positioned in front of the upper swing body 3. In this configuration, as illustrated in FIG. 17, the tooth point position image 61 is an image defined by a position Pgt (X,Y,Z) on the surface WAP of the object WA to be worked, when a tooth point 8T is projected on the object WA to be worked in a horizontal direction, that is, in a direction orthogonal to a direction in which gravity acts. The horizontal direction is the X direction or the Y direction in the global coordinate system (X,Y,Z), and is a direction orthogonal to Z. The processing device 51 uses information about the position Pgt (X,Y,Z) on the surface WAP of the object WA to be worked to generate the tooth point position image 61, the first straight line image 62, and the second straight line image 63, in a manner similar to the above. The processing device 51 converts the generated tooth point position image 61, first straight line image 62, and second straight line image 63, into an image viewed from the imaging device 19 to obtain the working implement guide image 60.

<About Processing For Obtaining Tooth Point Position Image 61>

Figure 18:
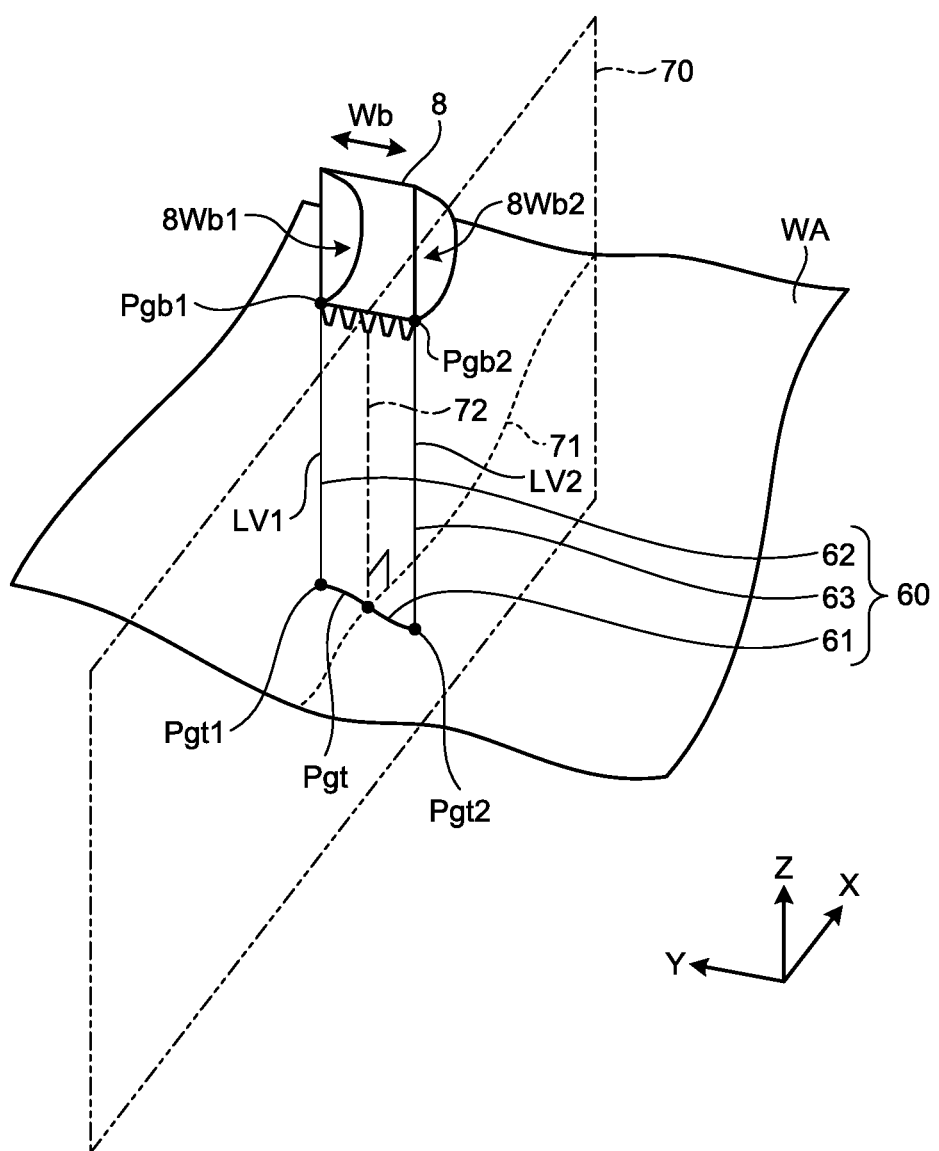
FIG. 18 is a diagram illustrating a first modification of processing for determining a tooth point position image.

FIG. 18 is a diagram illustrating a first modification of processing for determining a tooth point position image. In the first modification, the processing device 51 determines a straight line 72 orthogonal to an intersection line 71 between a virtual plane 70 and the object WA to be worked, and passing through a tooth point 8T of the bucket 8. The virtual plane 70 is an xz plane in the local coordinate system (x,y,z) of the excavator 1 illustrated in FIGS. 5 and 6. The xz plane passes through the center in the width direction Wb of the bucket 8.

Next, the processing device 51 determines the straight line LV1 and the straight line LV2. The straight line LV1 passes through the position Pgb1 on the outside of a tooth 8B at one end 8Wt1 in the width direction Wb of the bucket 8, and is parallel to the straight line 72, and the straight line LV2 passes through the position Pgb2 on the outside of a tooth 8B at the other end 8Wt2 in the width direction Wb, and is parallel to the straight line 72. The intersection between the straight line LV1 and the surface WAP of the object WA to be worked is the first position Pgt1, and the intersection between the straight line LV2 and the surface WAP of the object WA to be worked is the second position Pgt2. The processing device 51 determines the first position Pgt1 and the second position Pgt2, and defines the set of positions Pgt on the surface WAP of the object WA to be worked as the tooth point position image 61. The positions Pgt are obtained when a straight line connecting the first position Pgt1 and the second position Pgt2 is projected on the surface WAP.

The first straight line image 62 and the second straight line image 63 are images of the straight line LV1 and the straight line LV2. The processing device 51 converts the generated tooth point position image 61, first straight line image 62, and second straight line image 63, into an image viewed from the imaging device 19 to obtain the working implement guide image 60. Since the bucket 8 moves parallel to the virtual plane 70, the tooth point position image 61 obtained by the processing of the first modification indicates a position of the object WA to be worked to which a tooth point 8T of the bucket 8 is moved.

Figure 19:
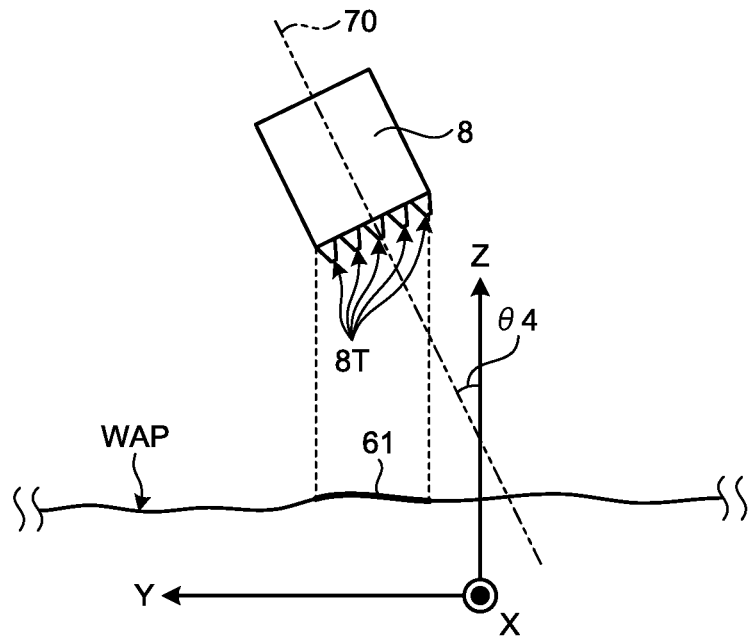
FIG. 19 is a diagram illustrating a second modification of processing for determining a tooth point position image.
Figure 20:
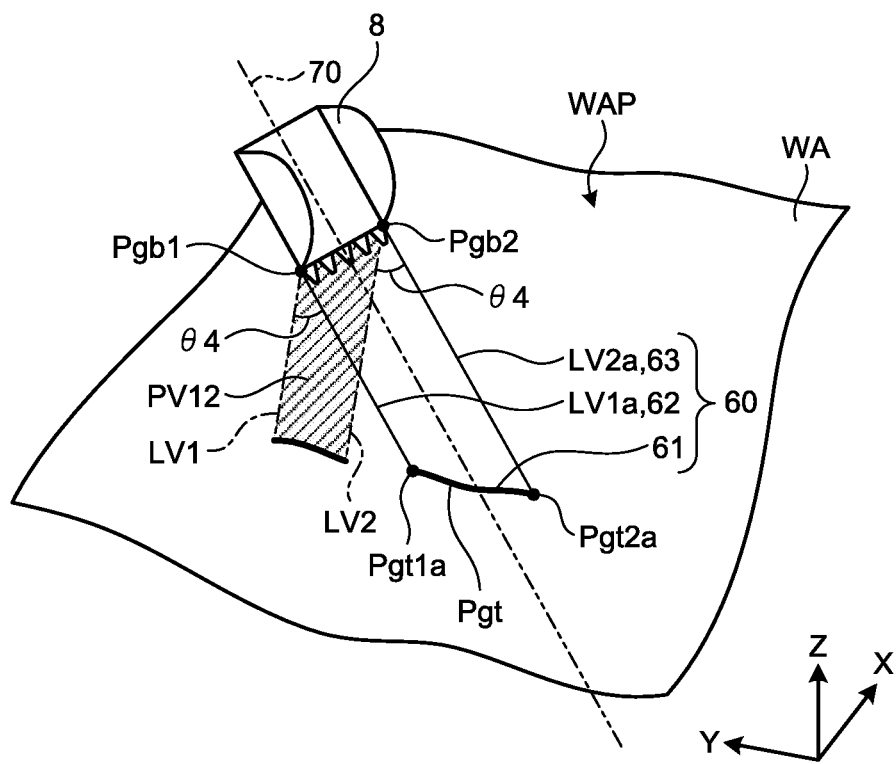
FIG. 20 is a diagram illustrating a second modification of processing for determining a tooth point position image.

FIGS. 19 and 20 are diagrams illustrating a second modification of processing for determining a tooth point position image. When the upper swing body 3 of the excavator 1 is inclined relative to a horizontal plane, that is, an XY plane of the global coordinate system (X,Y,Z), a row of tooth points 8T of the bucket 8 may be inclined relative to the surface WAP of the object WA to be worked, as illustrated in FIG. 19. Since the bucket 8 moves parallel to the virtual plane 70 described above, when a tooth point position image 61 is obtained by projecting the tooth points 8T onto the surface WAP of the object WA to be worked positioned in the vertical direction from the tooth point 8T, the moving direction of the bucket 8 and the tooth point position image 61 may be misaligned.

In the second modification, the processing device 51 determines the straight line LV1 and the straight line LV2 extending vertically from the tooth point position P4 of the bucket 8. Next, the processing device 51 rotates the obtained straight line LV1 and straight line LV2 by an angle at which the upper swing body 3 of the excavator 1 is inclined relative to the horizontal plane, that is, by the roll angle θ4. A direction in which the straight line LV1 and the straight line LV2 are rotated is a direction in which the straight line LV1 and the straight line LV2 are parallel to the virtual plane 70. In this configuration, the processing device 51 rotates the straight line LV1 and the straight line LV2 by θ4, on a plane PV12 formed by the straight line LV1 and the straight line LV2, about the positions Pgb1 and Pgb2 of the bucket 8. In this way, the processing device 51 obtains a straight line LV1a and a straight line LV2a after the rotation.

Next, the processing device 51 determines the intersections between the straight line LV1a and the straight line LV2a after rotation, and the surface WAP of the object WA to be worked, and defines the obtained two intersections as the first position Pgt1a and the second position Pgt2a, respectively. Then, the processing device 51 defines a set of positions Pgt on the surface WAP of the object WA to be worked, as the tooth point position image 61. The positions Pgt are obtained upon projecting a straight line connecting the first position Pgt1a and the second position Pgt2a onto the surface WAP. The first straight line image 62 and the second straight line image 63 are images of the straight line LV1a and the straight line LV2a. The processing device 51 converts the generated tooth point position image 61, first straight line image 62, and second straight line image 63, into an image viewed from the imaging device 19 to obtain the working implement guide image 60. The tooth point position image 61 obtained by the processing in the second modification indicates a position of the object WA to be worked to which the tooth points 8T of the bucket 8 are moved.

<Modification of Control System of Excavator 1>

Figure 21:
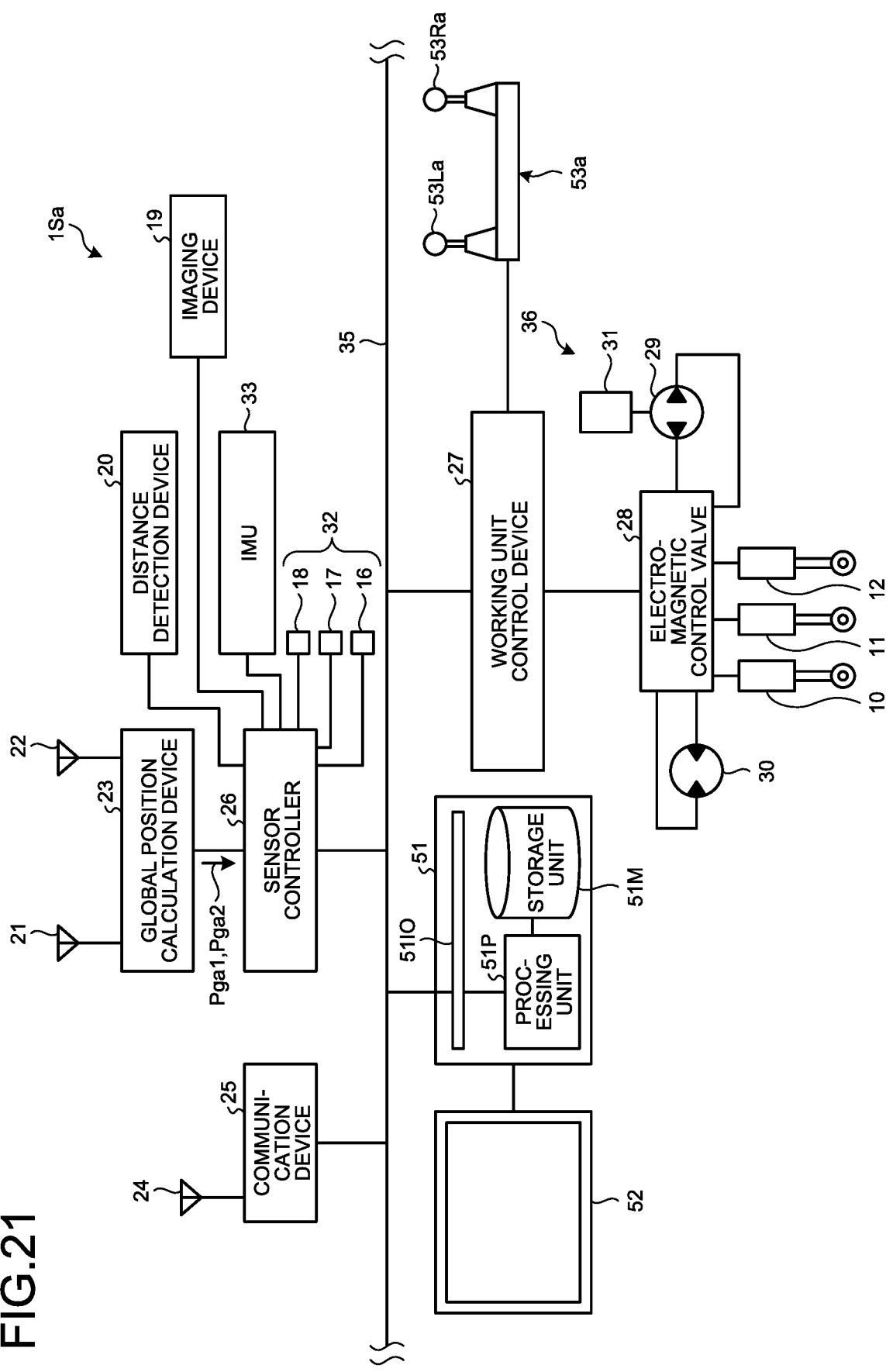
FIG. 21 is a diagram illustrating a control system of an excavator according to a modification.

FIG. 21 is a diagram illustrating a control system 1Sa of an excavator 1 according to a modification. The image display system 100 and the remote operation system 101 described above use the operation device 53 in the facility 50 illustrated in FIG. 1 to remotely operate the excavator 1. In the present modification, the display device 52 is provided in the cab 4 illustrated in FIG. 2, and the work image 69 is displayed on the display device 52 to assist the operator's operation for the excavator 1.

Therefore, in the control system 1Sa, the processing device 51 and an operation device 53a are connected to the signal line 35 of the control system 1S described above. The display device 52 is connected to the processing device 51. The processing device 51 included in the control system 1Sa has a similar function to that of the processing device 51 included in the facility 50 illustrated in FIG. 1, in the image display system 100 and the remote operation system 101 described above. The display device 52 of the control system 1Sa may be a dedicated display device for displaying the work image 69 or may be a display device included in the excavator 1.

The operation device 53a is a device for operating the excavator 1, and includes a left operation lever 53La and a right operation lever 53Ra. The operation device 53a may be actuated by pilot hydraulic pressure or may be actuated electrically.

The excavator 1 including the control system 1Sa displays the working implement guide image 60 and the grid image 65 generated as viewed from the imaging device 19, on the display device 52 in the cab 4, together with the image 68 of an actual object WA to be worked imaged by the imaging device 19. Owing to such processing, the excavator 1 can be configured so that the operator operating the excavator 1 using an image of the object WA to be worked displayed on the display device 52 can readily grasp a positional relationship between the position of the bucket 8 and the object WA to be worked. As a result, working efficiency and working accuracy can be improved. Furthermore, an inexperienced operator can use the excavator 1 including the control system 1Sa to readily grasp a positional relationship between the position of the bucket 8 and the object WA to be worked. As a result, reduction in working efficiency or working accuracy can be prevented. Furthermore, even in night work or the like, the operator who cannot see the actual object WA to be worked can perform work while watching the working implement guide image 60 and the grid image 65 displayed on the display device 52, and reduction in working efficiency is prevented.

The embodiments have been described above, but the embodiments are not limited to the above description. Furthermore, the components described above include a component conceived by those skilled in the art, a substantially identical component, and a so-called equivalent component. The above components can be appropriately combined with each other. At least one of various omission, substitution, and alteration of the components may be made without departing from the spirit and scope of the embodiments. The work machine is not limited to the excavator 1, and may be another work machine, such as a wheel loader or a bulldozer.

REFERENCE SIGNS LIST

1 EXCAVATOR
1B VEHICLE BODY
1S, 1Sa CONTROL SYSTEM
2, 2a WORKING UNIT
3 UPPER SWING BODY
4 DRIVER'S SEAT
6 BOOM
7 ARM
8 BUCKET
8B TOOTH
8T TOOTH POINT
16 FIRST STROKE SENSOR
17 SECOND STROKE SENSOR
18 THIRD STROKE SENSOR
19 IMAGING DEVICE
20 DISTANCE DETECTION DEVICE
21, 22 ANTENNA (GNSS ANTENNA)
23 GLOBAL POSITION CALCULATION DEVICE ≈SENSOR CONTROLLER
27 WORKING UNIT CONTROL DEVICE
32 ATTITUDE DETECTION DEVICE
33 IMU
50 FACILITY
51 PROCESSING DEVICE
52 DISPLAY DEVICE
53, 53a OPERATION DEVICE
60 WORKING IMPLEMENT GUIDE IMAGE (IMAGE)
61 TOOTH POINT POSITION IMAGE
62 FIRST STRAIGHT LINE IMAGE
63 SECOND STRAIGHT LINE IMAGE
65 GRID IMAGE
66 FIRST LINE IMAGE
67 SECOND LINE IMAGE
68 IMAGE
69 WORK IMAGE
100 IMAGE DISPLAY SYSTEM FOR WORK MACHINE (IMAGE DISPLAY SYSTEM)
101 REMOTE OPERATION SYSTEM FOR WORK MACHINE (REMOTE OPERATION SYSTEM)

The invention claimed is:

1. An image display system for a work machine comprising:
   a display device; and
   a processing device configured, by using information about a position of a working implement obtained using an attitude of a working unit having the working implement, and information about a three-dimensional terrain of an object to be worked of the working unit obtained from information about a distance to a terrain surface to be worked that is the object to be worked by the working unit, determined by a distance detection device included in a work machine including the working unit, to generate an image of a portion corresponding to the working implement, on the object to be worked opposing the working implement, with an imaging device capturing an image of the object to be worked as a reference, and configured to combine generated image with an image of the object to be worked imaged by the imaging device, and configured to display the combined image on the display device,
   wherein the processing device generates straight line images as images of straight lines vertically extended from both ends in a width direction of the working implement to the object to be worked,
   the processing device generates a tooth point position image projecting a line connecting respective intersections between the vertically extended straight lines and the object to be worked, onto the surface of the object to be worked, as the image of the portion corresponding to the working implement,
   the processing device combines the straight line images and the tooth point position image as a working implement guide image with the image of the object to be worked, and displays the combined image on the display device, and
   the display device and the processing device are provided to remotely operate the work machine.

2. The image display system for a work machine according to claim 1, wherein the processing device is further configured to generate a line image along a surface of the object to be worked, by using the information about the three-dimensional terrain of the object to be worked, the processing device is further configured to combine the line image with the image of the object to be worked, and the processing device is further configured to display the combined image on the display device.

3. The image display system for a work machine according to claim 2, wherein the line image includes grids having a plurality of first line images, and a plurality of second line images crossing the plurality of first line images.

4. The image display system for a work machine according to claim 1, wherein
   the working implement has a bucket, and
   the processing device is further configured to generate a line image of a portion corresponding to tooth points of the bucket, on the object to be worked, as the image of the portion corresponding to the working implement, on the object to be worked opposing the working implement.

5. The image display system for a work machine according to claim 4, wherein the processing device is further configured to generate an image of a straight line connecting the object to be worked and a side of one end in a width direction of the tooth points of the bucket, and an image of a straight line connecting the object to be worked and a side of another end in the width direction of the tooth points of the bucket, the processing device is further configured to combine the generated image with the image of the object to be worked imaged by the imaging device, and the processing device is further configured to display the combined image on the display device.

6. The image display system for a work machine according to claim 1, wherein the processing device is further configured to determine spatial position information about the working implement or the object to be worked, and the processing device is further configured to display the spatial position information on the display device.

7. The image display system for a work machine according to claim 1, wherein the processing device is further configured to determine at least one of the position of the working implement, the attitude of the working unit, a position of the object to be worked, a relative attitude of the object to be worked, a relative distance between the working implement and the object to be worked, and a relative attitude of the working implement and the object to be worked to be displayed on the display device.

8. The image display system for a work machine according to claim 1, wherein the processing device is further configured to determine an area occupied by the working implement in the image of the object to be worked, by using the attitude of the working unit, and the processing device is further configured to remove the determined area from information about a terrain of the object to be worked.

9. The image display system for a work machine according to claim 1, wherein
   the imaging device and the distance detection device are provided in the work machine, and
   the processing device and the display device are provided in a facility including an operation device configured to remotely control the work machine.

10. The image display system for a work machine according to claim 1, wherein
    the work machine is comprising a upper swing body, and
    the imaging device and the distance detection device are provided in the upper swing body.

11. A remote operation system for a work machine comprising:
    the image display system for a work machine according to claim 1; and
    an operation device configured to operate the working unit included in the work machine.

12. An image display system for a work machine, comprising:
    a sensor controller at a remote work machine, configured to acquire information including a position of a swing body of the working machine, a position of a working implement of a working unit of the work machine, an image of an object to be worked, and information about a distance of the object to be worked from the working unit;
    a communication device at the remote work machine and coupled to the sensor controller, configured to transmit to a facility, the acquired information of the sensor controller;
    a communication device located at the facility, configured to receive the information from the remote work machine;
    a processing device located at the facility and coupled to the communication device at the facility, configured to process the information received from the remote work machine, to generate an image of a portion corresponding to the working implement, on the object to be worked opposing the working implement, with the an imaging device as a reference, and configured to combine generated image with the image of the object to be worked imaged by the imaging device, and configured to display the combined image on a display device;

a display device located at the facility and coupled to the processing device, configured to display the combined image to an operator located at the facility; and an operation device located at the facility and coupled to the processing device, configured to receive operating control from the operator to remotely control at least one of the position of the swing body, the position of the working unit or the position of the working implement and in response to provide operating control information to the processing device to control the position of a corresponding at least one of the swing body, the working unit, or the working implement;

wherein the processing device is configured to generate a command for control of the position of the corresponding at least one of the swing body, the working unit, or the working implement and to cause the communication device at the facility to transmit the generated command to the communication device of the working machine, wherein the communication device of the working machine receives the command from the processing device, and provides the command to a working unit control device at the work machine;

wherein working unit control device at the work machine causes the corresponding at least one of the swing body, the working unit, or the working implement to move its position according to the command, and wherein the processing device generates straight line images as images of straight lines vertically extended from both ends in a width direction of the working implement to the object to be worked, the processing device generates a tooth point position image projecting a line connecting respective intersections between the vertically extended straight lines and the object to be worked, onto the surface of the object to be worked, as the image of the portion corresponding to the working implement, the processing device combines the straight line images and the tooth point position image as a working implement guide image with the image of the object to be worked, and displays the combined image on the display device, and the display device and the processing device are provided to remotely operate the work machine.

* * * * *